United States Patent [19]

Taylor et al.

[11] Patent Number: 5,307,295
[45] Date of Patent: Apr. 26, 1994

[54] CREATING AND CONTROLLING LIGHTING DESIGNS

[75] Inventors: Brooks W. Taylor; Andrew J. P. Meldrum, both of Dallas, Tex.

[73] Assignee: Vari-Lite, Inc., Dallas, Tex.

[21] Appl. No.: 641,031

[22] Filed: Jan. 14, 1991

[51] Int. Cl.$^5$ .............................. G06F 15/20
[52] U.S. Cl. .................... 364/578; 315/292
[58] Field of Search .......... 364/578, 140, 188; 315/292

[56] References Cited

U.S. PATENT DOCUMENTS

| | | | |
|---|---|---|---|
| 4,158,132 | 6/1979 | O'Dell | 315/292 |
| 4,656,603 | 4/1987 | Dunn | 362/85 |
| 4,703,412 | 10/1987 | Cunningham et al. | 362/85 |
| 4,868,766 | 9/1989 | Oosterholt | 362/283 |
| 4,894,760 | 1/1990 | Callahan | 362/85 |
| 4,947,302 | 8/1990 | Callahan | 362/85 |
| 4,980,806 | 12/1990 | Taylor et al. | 362/85 |
| 5,066,896 | 11/1991 | Bertenshaw et al. | 315/292 |

OTHER PUBLICATIONS

Design Focus; "Intelligent Lamp-dimmer for Studio lighting"; New Electronic vol. 11, No. 14 (1978).
Muller et al; "Sitralux B30, a lighting Control System for Stages and T.V. Studio."; Siemens Review XLV (1979).
"Microcomputers in Stage Lighting," by Michael R. Brooks, published in Theatre Crafts, Apr. 1983, pp. 30 and 77 through 80.
"Showplot: A New Program for Lighting Designers," by James L. Moody, published in Theatre Crafts, Aug.-/Sep. 1985, pp. 28 and 86 through 88.
"Filevision for your Lighting Design," by John Weygandt, published in Theatre Crafts, Oct. 1985, pp. 100 through 107.
van Bergen, J., "Software for LDs: What's Hot, and Who's Using What?," Lighting Dimensions, vol. 17, No. 3, pp. 36-41 (Apr. 1993).
Verbeck, C. and Greenberg, D., "A Comprehensive Light-Source Description for Computer Graphics," IEEE Computer Graphics and Applications, vol. 4, No. 7, pp. 66-75 (Jul. 1984).
Dorsey, J. et. al., "Design and Simulation of Opera Lighting and Projection Effects," Computer Graphics, vol. 25, No. 4, pp. 41-50 (Jul. 1991).
'Lichtplanung Auf Personal Computern,' Electro-Revue, vol. 80, No. 23 pp. 56-57 (Nov. 1988).
Egger, W., "Influence of Objects In Rooms On Illuminance and Luminance Distribution," J. of the Ill. Engg. Soc'y, pp. 308-313 (Apr. 1984).

Primary Examiner—Jack B. Harvey
Assistant Examiner—Ellis B. Ramirez
Attorney, Agent, or Firm—Morgan & Finnegan

[57] ABSTRACT

A modelling and control system for creating lighting designs off-line and for controlling on-line the operation of the actual lighting systems producing those designs. Using a programmable computer, the modelling system prompts inputs by the designer/programmer describing model objects and their parameters including stage dimensions, set pieces and their locations, performers and their positions, trusses, lamps and their parameters such as color, focus, intensity, beam edge, and the relations among the objects. The sytem computes the resutant lighting scenes, organized as cues and arranged and formatted to be compatible with actual lighting controller usage. The system displays the model environment in such a way as to facilitate the modelling operation and its results. It also also generates a variety of spreadsheets for use by the designer.

62 Claims, 32 Drawing Sheets

FIG. 4A MODEL WINDOW SAMPLE (ENGLISH UNITS)

| NAME | TYPE | CHAN. NO. | SHOWN/ HIDDEN | SURF. COLOR | FOCUS | COLOR | BEAM SIZE | SUPPORT | DIMENSIONS | LOCATION FROM MASTER MARKER OR SUPPORT | ROTATION ABOUT SUPPORT |
|---|---|---|---|---|---|---|---|---|---|---|---|
| 500 | CONV. | 500 | YES | - | DRUM-MER | COLOR | 10 | TRUSS 2 UP | - | UPSTAGE 10' 0" ABOVE 30' 0" STAGE LEFT 10' 10" | UPSTAGE 0 VERTICAL 0 CROSS-STAGE 0 |
| 501 | CONV. | 501 | YES | - | SING-ER | ROS-COLUX #02 | 15 | TRUSS 2 DOWN | - | UPSTAGE 10' 0" ABOVE 30' 0" STAGE RIGHT 10' 10" | UPSTAGE 0 VERTICAL 0 CROSS-STAGE 0 |
| 502 | CONV. | 502 | YES | - | SING-ER | GAM-COLOR #520 | 20 | TRUSS 2 UP | - | UPSTAGE 10' 0" ABOVE 30' 0" STAGE LEFT 0' 0" | UPSTAGE 0 VERTICAL 0 CROSS-STAGE 0 |
| STAGE | SET-PIECE | - | YES | COLOR | - | - | - | FLOOR/ CEILING | HEIGHT 12" DEPTH 120" WIDTH 240" | UPSTAGE 0' 0" ABOVE 0' 0" STAGE LEFT 0' 0" | UPSTAGE 0 VERTICAL 0 CROSS-STAGE 0 |
| DRUM-MER | TAR-GET | - | YES | COLOR | - | - | - | STAGE | HEIGHT 60" DEPTH 48" WIDTH 120" | UPSTAGE 5' 0" ABOVE 3' 0" STAGE LEFT 0' 0" | UPSTAGE 0 VERTICAL 0 CROSS-STAGE 0 |
| SINGER | TAR-GET | - | YES | COLOR | - | - | - | STAGE | HEIGHT 66" DEPTH 18" WIDTH 18" | DOWNSTAGE 2' 0" ABOVE 0' 0" STAGE LEFT 0' 0" | UPSTAGE 0 VERTICAL 0 CROSS-STAGE 0 |
| TRUSS 1 | TRUSS | - | YES | COLOR | - | - | - | FLOOR/ CEILING | LENGTH 240" WIDTH 24" | UPSTAGE 30' 0" ABOVE 30' 0" STAGE LEFT 0' 0" | UPSTAGE 0 VERTICAL 0 CROSS-STAGE 0 |
| TRUSS 2 | TRUSS | - | YES | COLOR | - | - | - | FLOOR/ CEILING | LENGTH 240" WIDTH 24" | UPSTAGE 10' 0" ABOVE 30' 0" STAGE LEFT 0' 0" | UPSTAGE 0 VERTICAL 0 CROSS-STAGE 0 |
| PIPE 1 | TRUSS | - | YES | COLOR | - | - | - | FLOOR/ CEILING | LENGTH 240" | DOWNSTAGE 9' 10" BELOW 6' 7" STAGE LEFT 0' 0" | UPSTAGE 0 VERTICAL 0 CROSS-STAGE 0 |
| PIPE 2 | TRUSS | - | NO | COLOR | - | - | - | FLOOR/ CEILING | LENGTH 240" | DOWNSTAGE 6' 7" BELOW 6' 7" STAGE LEFT 0' 0" | UPSTAGE 0 VERTICAL 0 CROSS-STAGE 0 |

FIG. 4B MODEL WINDOW SAMPLE (ENGLISH UNITS)

| NAME | TYPE | CHAN. NO. | SHOWN/ HIDDEN | SURF. COLOR | FOCUS | COLOR | BEAM SIZE | SUPPORT | DIMEN- SIONS | LOCATION FROM MASTER MARKER OR SUPPORT | ROTATION ABOUT SUPPORT |
|---|---|---|---|---|---|---|---|---|---|---|---|
| 1 | VL2B | 1 | YES | - | - | - | - | TRUSS 1 UP | - | UPSTAGE 30' 0"<br>ABOVE 30' 0"<br>STAGE LEFT 10' 10" | UPSTAGE 0<br>VERTICAL 0<br>CROSS-STAGE 0 |
| 2 | VL2B | 2 | YES | - | - | - | - | TRUSS 1 UP | - | UPSTAGE 30' 0"<br>ABOVE 30' 0"<br>STAGE LEFT 10' 10" | UPSTAGE 180<br>VERTICAL 180<br>CROSS-STAGE 180 |
| 3 | VL2B | 3 | YES | - | - | - | - | TRUSS 1 UP | - | UPSTAGE 30' 0"<br>ABOVE 30' 0"<br>STAGE LEFT 0' 0" | UPSTAGE -180<br>VERTICAL -180<br>CROSS-STAGE -180 |
| 4 | VL2B | 4 | YES | - | - | - | - | PIPE 1 | - | DOWNSTAGE 9' 10"<br>BELOW 6' 7"<br>STAGE LEFT 13' 1" | UPSTAGE 0<br>VERTICAL 0<br>CROSS-STAGE 0 |
| 5 | VL2B | 5 | YES | - | - | - | - | PIPE 1 | - | DOWNSTAGE 9' 10"<br>BELOW 6' 7"<br>STAGE RIGHT 13' 1" | UPSTAGE 0<br>VERTICAL 0<br>CROSS-STAGE 0 |
| 41 | VL4 | 41 | YES | - | - | - | - | TRUSS 1 DOWN | - | UPSTAGE 20' 0"<br>ABOVE 30' 0"<br>STAGE LEFT 10' 10" | UPSTAGE 0<br>VERTICAL 0<br>CROSS-STAGE 0 |
| 42 | VL4 | 42 | YES | - | - | - | - | TRUSS 1 DOWN | - | UPSTAGE 20' 0"<br>ABOVE 30' 0"<br>STAGE RIGHT 10' 10" | UPSTAGE 180<br>VERTICAL 180<br>CROSS-STAGE 180 |
| 43 | VL4 | 43 | YES | - | - | - | - | TRUSS 1 DOWN | - | UPSTAGE 20' 0"<br>ABOVE 30' 0"<br>STAGE LEFT 0' 0" | UPSTAGE -180<br>VERTICAL -180<br>CROSS-STAGE -180 |
| 44 | VL4 | 44 | YES | - | - | - | - | PIPE 2 | - | DOWNSTAGE 6' 7"<br>BELOW 6' 7"<br>STAGE LEFT 13' 1" | UPSTAGE 0<br>VERTICAL 0<br>CROSS-STAGE 0 |
| 45 | VL4 | 45 | YES | - | - | - | - | PIPE 2 | - | DOWNSTAGE 6' 7"<br>BELOW 6' 7"<br>STAGE RIGHT 13' 1" | UPSTAGE 0<br>VERTICAL 0<br>CROSS-STAGE 0 |

FIG. 5A

| TYPE | NAME | CHAN. NO. | SHOWN/HIDDEN | SURF. COLOR | FOCUS | COLOR | BEAM SIZE | SUPPORT | DIMENSIONS | |
|---|---|---|---|---|---|---|---|---|---|---|
| VL2B | NAME | 1..499 | YES OR NO | - | - | - | - | SUPPORT NAME | | |
| VL4 | NAME | 1..499 | YES OR NO | - | - | - | - | SUPPORT NAME | | |
| CONV. | NAME | 500..999 | YES OR NO | - | TAR-GET NAME | (YOUR GEL COLOR HERE) | SIZE | SUPPORT NAME | | |
| - | - | - | - | - | - | (YOUR GEL NO. HERE) | - | - | | |
| TRUSS | TRUSS NAME | - | YES OR NO | (YOUR SURF. COLOR HERE) | - | - | - | SUPPORT NAME | HEIGHT 0..XXX' 0..11" OR<br>DEPTH 0..XXX' 0..11" OR<br>WIDTH 0..XXX' 0..11" OR | 0.00..XX.99 M<br>0.00..XX.99 M<br>0.00..XX.99 M |
| PIPE | PIPE NAME | - | YES OR NO | (YOUR SURF. COLOR HERE) | - | - | - | SUPPORT NAME | HEIGHT 0..XXX' 0..11" OR<br>DEPTH 0..XXX' 0..11" OR<br>WIDTH 0..XXX' 0..11" OR | 0.00..XX.99 M<br>0.00..XX.99 M<br>0.00..XX.99 M |
| SET-PIECE | SET-PIECE NAME | - | YES OR NO | (YOUR SURF. COLOR HERE) | - | - | - | SUPPORT NAME | HEIGHT 0..XXX' 0..11" OR<br>DEPTH 0..XXX' 0..11" OR<br>WIDTH 0..XXX' 0..11" OR | 0.00..XX.99 M<br>0.00..XX.99 M<br>0.00..XX.99 M |
| TAR-GET | TAR-GET NAME | - | YES OR NO | (YOUR SURF. COLOR HERE) | - | - | - | SUPPORT NAME | HEIGHT 0..XXX' 0..11" OR<br>DEPTH 0..XXX' 0..11" OR<br>WIDTH 0..XXX' 0..11" OR | 0.00..XX.99 M<br>0.00..XX.99 M<br>0.00..XX.99 M |

FIG. 5B

| CHANNEL | TYPE | NAME | INTENSITY | FOCUS | COLOR | BEAM SIZE | EDGE | GOBO | DOUSER | TIMING | |
|---|---|---|---|---|---|---|---|---|---|---|---|
| 1 | VL2B | 1 | 100.0 | DRUMMER | STD A 1 | 5.00 | 100.0 | 1 | - | I 0.00 C 0.00 | F 2.00 O 2.00 |
| 2 | VL2B | 2 | 100.0 | SINGER | CUST B 2 | 24.00 | 100.0 | 2 | - | I F CO | 200 |
| 3 | VL2B | 3 | 0.0 | A 3 | OPEN C 20 | 24.00 | 100.0 | 3 | - | I F C | I 3.00 O 9.59 |
| 4 | VL2B | 4 | 75.5 | A 20 | W1 1 W2 12 | 5.00 | 75.5 | 7 | - | I 1.00 C 1.00 | F 2.00 O 2.00 |
| 5 | VL2B | 5 | MARK | P 180.0 T -180.0 | W1 13 W2 16 | 5.00 | 0.0 | 10 | - | I F CO | 100 |
| 41 | VL4 | 41 | 100.0 | DRUMMER | M 100.0% B 100.0% A 100.0% | 4.00 | 100.0 | - | OPEN | I 0.00 C 0.00 | F 2.00 O 2.00 |
| 42 | VL4 | 42 | 100.0 | SINGER | M 0.0% B 0.0% A 0.0% | 9.00 | 100.0 | - | OPEN | I F CO | 400 |
| 43 | VL4 | 43 | 0.0 | A 3 | M 50.0% B 50.0% A 50.0% | 9.00 | 100.0 | - | OPEN | I F C | I 3.00 O 9.59 |
| 44 | VL4 | 44 | 75.5 | A 20 | CUST B 2 | 7.75 | 75.5 | - | CLOSED | I 1.00 C 1.00 | F 2.00 O 2.00 |
| 45 | VL4 | 45 | MARK | P 180.0 T -180.0 | OPEN C 20 | 8.00 | 0.0 | - | CLOSED | I F CO | 100 |
| 500 | CONV | 500 | 100.0 | DRUMMER | COLOR | 10 | - | - | - | - | |
| 501 | CONV | 501 | 100.0 | SINGER | ROS-COLUX #02 | 15 | - | - | - | - | |
| 502 | CONV | 502 | MARK | SINGER | GAM-COLOR #520 | 20 | - | - | - | - | |

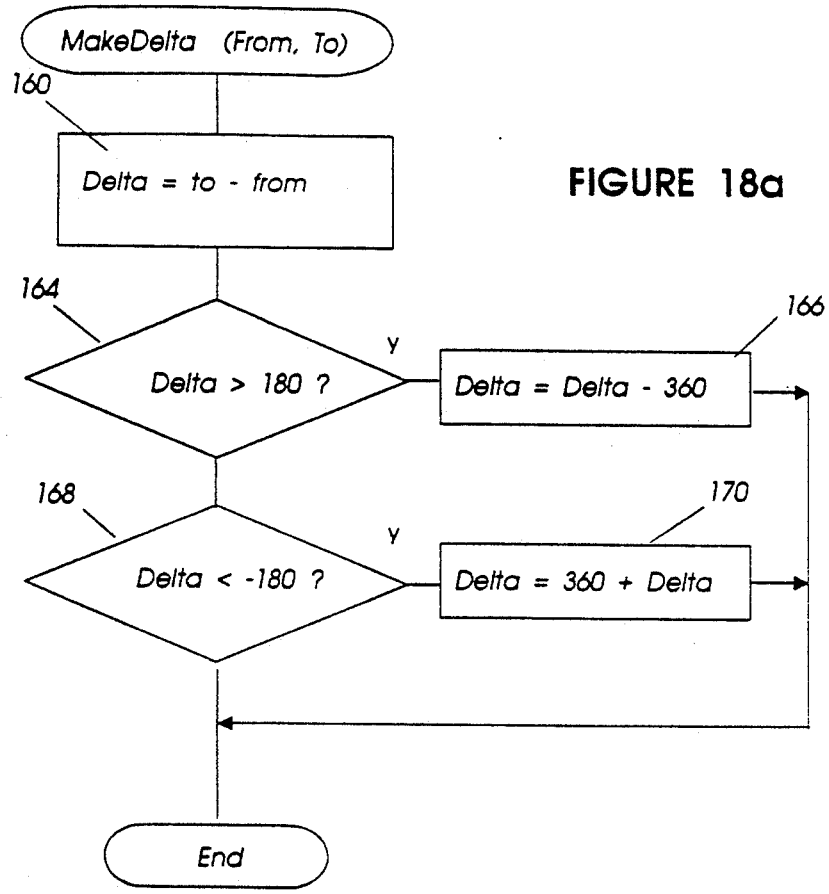
FIGURE 18a
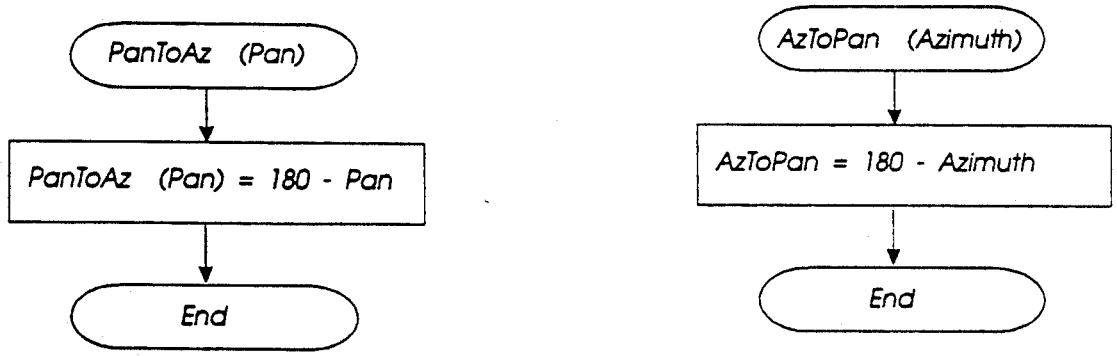
FIGURE 18b
FIGURE 18c

CREATING AND CONTROLLING LIGHTING DESIGNS

BACKGROUND--FIELD OF THE INVENTION

The present invention relates to a system for creating lighting designs and for controlling the operation of lighting systems used in presenting those designs Involved are both the off-line modelling of the lighting design including its environment and dynamic behaviour, and the on-line implementation the design through control of the lighting system.

BACKGROUND AND DISCUSSION OF PRIOR ART

Modern lighting projectors, such as those used in stage lighting applications, typically allow for the variation of many lighting parameters in order to achieve various lighting effects. Conventional lighting instruments offer variable control of the intensity of the light as well as its color (hue and saturation), direction (sometimes referred to as focus) and beam size, shape and sharpness. Pattern projections accomplished with "gobos" are also employed for certain effects.

Directing the beam of a variable multi-parameter lighting instrument, such as the VL2B ™, VL3 ™, or VL4 ™ models of automated lights manufactured by Vari-Lite, Inc., to a desired target or site is obtained by pivoting the light assembly within a "yoke" to achieve desired elevation or tilt, and by rotating the yoke to "pan" the beam.

Intensity is controlled in these lighting instruments by adjusting lamp excitation or using a mechanical "dowser" such as an iris. Color is achieved with adjustable dichroic filters while beam diameter and degree of sharpness/diffusion are established by iris or lens systems and diffusers.

A typical lighting system consists of an array of lights such as these in communication with a centralized, computer-based lighting controller operated from a console. The console can selectively access individual or groups of lights and by the adjustment of console controls, selected lights may be manipulated to direct each light to its proper target and to adjust the beam parameters that control the characteristics of the lights.

With many automated lights each offering programmable color, beam size, intensity, edge, and gobo pattern, as well as pan and tilt, and with many systems incorporating many scores of such lights located in variable positions, it is apparent that the lighting designer is confronted with a daunting and time-consuming task.

In stage lighting this task typically involves the creation during rehearsal of a series of lighting scenes or cues in accordance with the desired dramatic effects sought to be achieved. Each scene is initially designed using the console controls. (Light placement may also be involved.) Once the desired lighting effect is achieved in a setup or manual control mode, the console operator can store the parameters in computer memory as a cue for later access. The cue defines all of the lighting attributes such as pan, tilt, color, and beam size for each of the lights to be used in that cue.

Since the lighting designer needs to create lighting effects in the context of the performance and to observe the overall lighting effects as he varies each parameter, the traditional method of programming automated lighting systems requires use of the theatre, the presence of the cast and crew, and the entire lighting system, including all of the lights and the console as set up in the theater. While this on-line programming method is effective in creating the desired lighting production, it is a time consuming and costly process.

Significant cost savings could be experienced if the programming process or at least a significant part of it could be carried out without the need for cast, crew, theatre and system. This is true whether a production is to be designed from scratch, or where it has to be adapted to a new venue, as in the case of tours. In both cases, off-line programming also permits better use of on-line final programming to perfect the lighting production.

In response to these needs, a number of computer-based systems with graphics capabilities have been developed to provide off-line programming of automated lighting systems. These graphics systems are designed to partially simulate on a computer screen or other display, what certain real lighting effects will look like.

The "Starlite" system developed by Tasco, Ltd. of London simulates to a degree the overall lighting effect as the programmer adjusts the parameter data. The control console of the Tasco system incorporates a computer with a graphics display for programming the lights and simulating their functions. However, the system does not provide the ability to translate positional information of the lights and targets into cue data (pan and tilt values) for the lights. A similar product has been developed by "Joan Collins Associates", 953 N. Highland, Los Angeles, Calif.

It should also be recognized that an off-line computer-based simulation of theatre lighting is inherently limited. Consequently, to be truly effective and affordable, the modeling must involve uncomplicated, preferably intuitive tasks; and it must invoke fairly simple instrumentalities which nevertheless are sufficiently revealing or suggestive to enable the designer to visualize the real effect and the states or values of the variables contributing to that effect. Current systems are deficient in these respects.

Ideally, the system should also simulate the console controls to avoid the need for mastering new control/effect relationship.

It is accordingly an object of the invention to provide an improved lighting design instrument which permits off-line creation of lighting designs and thereby reduces dependence on the performers, the theatre and the lighting equipment.

A further object of the invention is to provide an instrument which facilitates the lighting designer's visualization of various lighting effects without the need to access the actual lighting equipment.

Still another object of the invention is to present the user with both schematic and realistic graphical displays, thereby allowing the user to eliminate representations of model data which are not of interest and permitting the use of low resolution or monochrome displays.

It is yet another object of the invention to provide off-line programming of lighting productions which can be simply and rapidly integrated into the actual lighting equipment system.

Yet another object of the invention is to provide an instrument for off-line creation of lighting productions which can be implemented with a relatively inexpensive computer system and which nevertheless computes and displays revealing simulations of lighting parameters.

A still further object of the invention is to provide an off-line lighting show design tool the output of which can be used to directly control lighting instruments. It is also an object to provide the output in a form permitting real time rendering of the lighting design.

Another object is to duplicate the control functions of the automated lighting console, allowing the modelling system to be used to directly control the luminaires in a situation where the effects of operator actions on the luminaires cannot be directly observed by the operator either from the modelling system or console location.

Still another object of the invention is to provide an off-line lighting design programming tool which can symbolize and simulate complex lighting relationships in a simple, uncluttered and revealing manner and without excessive response time.

It is also an object of the invention to provide such a programming instrument wherein there is produced a variety of displays suited to the varying needs of the designer.

Another object of the invention is to provide an off-line modelling system for a lighting set in which prompts for the user bear an analogous relationship to actual console configurations.

Yet another object of the invention is to provide an off-line modelling instrument for lighting productions which offers the user a choice of methods in specifying model data, and in which menus and dialog boxes facilitate use of the instrument. By embedding in the system terms and notations familiar to the lighting designer, and producing the customary actions associated with them, the user is able to communicate with the system using the same vocabulary and achieving the same results as would be the case with a human rather than machine lighting designer assistant.

Further objects of the invention are to provide an off-line modelling system for lighting designs in which a mathematically correct three dimensional model of the performers, the set, the trussing and the luminaires of the show is computed and displayed; in which pan and tilt values can be calculated in terms of target position; in which model elements are automatically adjusted when related elements are changed, and in which updating and revising is simply accomplished.

SUMMARY OF THE INVENTION

In the implementation of the invention, a system is provided for modelling a lighting production including the characteristics of the production site and the lighting scenes produced by the lighting console and the lighting instruments without requiring access to the site and instruments. The system utilizes a computer having data entry means, a processor, storage means, a monitor and a graphics generating program. The modelling system further includes:

(1) means for receiving data:
 (a) describing relevant parameters of the lighting site including lighting targets;
 (b) identifying the selection of the lighting instruments to be operational in the production of the lighting designs;
 (c) describing the location of the selected lighting instruments;
 (d) describing values of the lighting parameters associated with each of said selected lighting instruments;

(2) means for computing from the site, light selection, light location and value data, mathematically correct three dimensional representations of the desired aggregate lighting designs;

(3) means for displaying certain of these representations on the monitor; and (4) means for configuring the results of the computations in a form suitable for ultimate use by said actual lighting instruments.

According to other features of the invention:

1. The data receiving means include means displayed on the monitor for prompting the entry of valid data.

2. Means are included for computing the relationships among the received data such that changes in certain of the data produce related changes in data dependent thereon.

3. Also provided are means for generating at least one spreadsheet generally conforming to the type employed by a lighting designer in describing the actual lighting production.

4. The computing of scene representations includes means for simultaneously generating and displaying views of the lighting scenes from different perspectives.

5. The scene display is generated such that the contributions of the site, light selection, light location and light parameter values are readily discernible.

6. The modelling includes the generation of pan and tilt values as a function of lighting instrument location/orientation and target coordinates.

7. The components of the site parameters and lighting are organized on a hierarchical basis.

8. The modelling process is materially enhanced by generating menus, dialog boxes and icons to facilitate entering of valid data in valid sequences.

9. The modelling process organizes the lighting scene parameters as cues which can be stored and recalled.

10. The lighting parameters can be specified in terms of target positions and, in the case of beam positioning, the computing system will automatically compute the required pan and tilt.

11. Target volumes can also be represented in the model as objects and can be moved and sized producing corresponding adjustments in related objects and attributes.

12. The modelling system is adapted to be in bidirectional communication with the console permitting the exchange of data and the sharing of roles.

13. The modelling system includes means for specifying the relationship between model objects.

14. Dynamic aspects of the lighting scenes can be modelled and simulated.

From the process point of view, the invention can be summarized as a method for modelling a lighting production including the production site and the lighting designs produced by the lighting console and lighting instruments. The modelling method employs a computing system having a graphic display program, data entry means, data processing means, and a monitor. The method comprises the steps of (1) entering data into the computing system describing
 (a) relevant characteristics of the lighting site;
 (b) identifying the lighting instruments to be involved in a scene;

(2) generating a display on the monitor representative of the described site;

(3) entering in the computing system, data related to the positional relationship of the selected instruments to the lighting site;

(4) generating on the monitor a display of the site with the selected instruments showing the positions thereof;

(5) entering in the computing system, data describing the lighting parameters of each of the selected lighting instruments including, where desired, lighting beam color and beam direction;

(6) generating for evaluation a display on the monitor simulating the aggregate lighting effects produced by the site, the lighting instrument selection, the positioning and the parameter adjustments; and (7) repeating prior steps as necessary until a desired display is achieved.

BRIEF DESCRIPTION OF DRAWINGS

A more complete understanding of the present invention may be had by reference to the following Detailed Description with the accompanying drawings, wherein:

FIGS. 4a and 4b are views of model data displayed in a spreadsheet format;

FIGS. 5a and 5b illustrate other spreadsheet formats for the model data;

FIGS. 14 through 17 and FIGS. 18A, 18B and 18C describe processing steps used in computing various lamp positions;

DESCRIPTION OF THE PREFERRED EMBODIMENT

Figure 1:
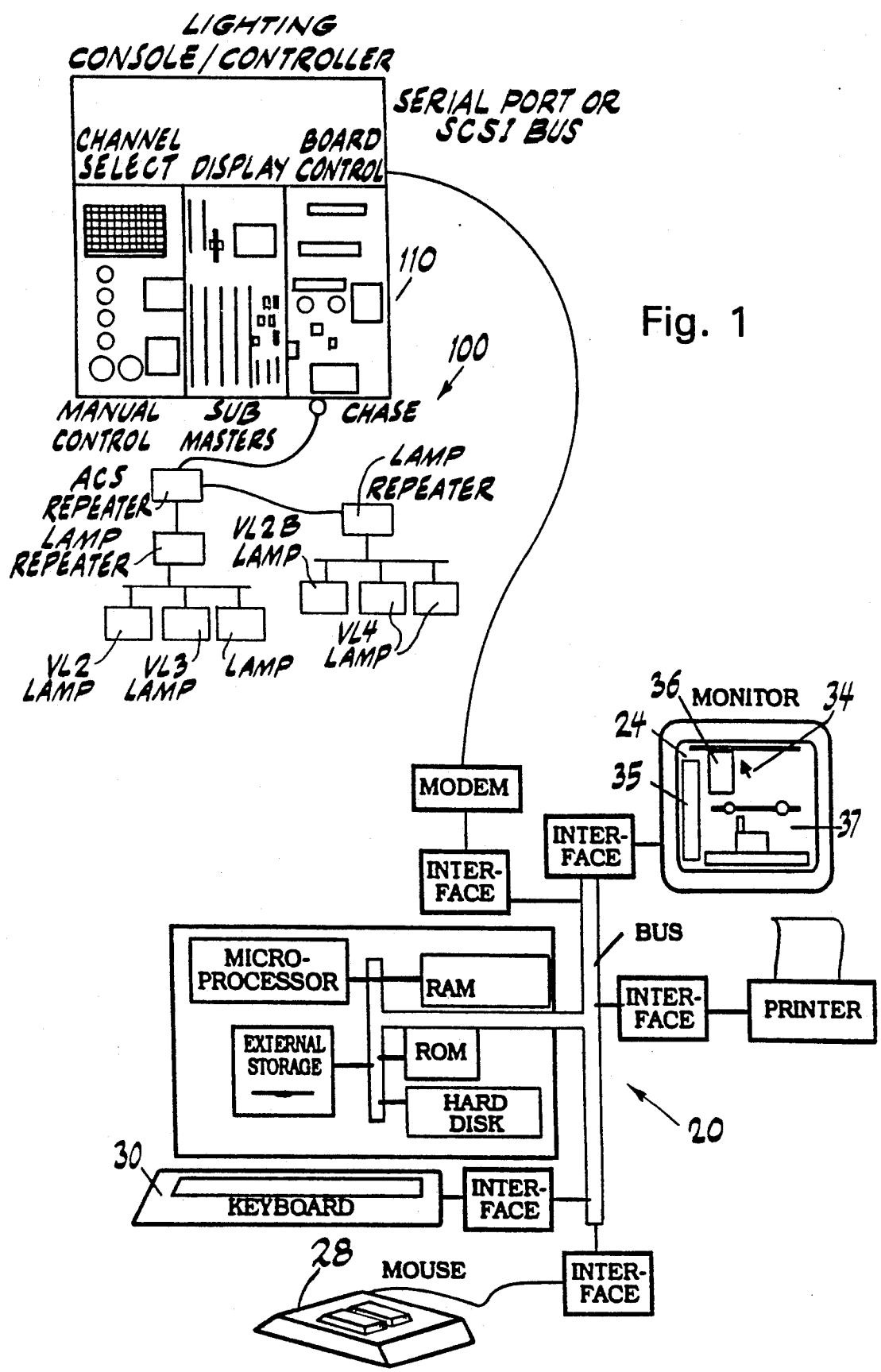
FIG. 1 is a schematic block diagram illustrating components of the design instrument and its association with a lighting system.

Certain aspects of the invention are illustrated in FIG. 1 where a computing system 20 is displayed for modelling the lighting production eventually to be produced by the actual lighting system 100. The latter includes a lighting console 110 such as the ARTISAN TM or MINI-ARTISAN TM marketed by Vari-Lite, Inc., and a network of lamps which may for example be various combinations of the models VL2, VL2B, VL3 and VL4 previously referenced.

The lighting controller may be of the type associated with the Vari-Lite VL200 series lighting system and portions of the controller may also be configured as described in U.S. Pat. No. 4,980,806, issued to Taylor and Walsh on Dec. 25, 1990.

The computing system 20 is a general purpose computer running under the graphic system described hereinafter. The preferred computer model is a Apple Macintosh II fx. It includes a microprocessor, RAM, ROM, storage and interfaces with the user via mouse 28 and keyboard 30. A modem for communication is also provided and data can be printed on the hard copy printer.

To facilitate an understanding of the implementation of the invention, certain general factors of the illustrated embodiments are first described. The design includes a modelling system and a method for modelling, programming, and simulating the functions of an automated lighting system such as 100 having variable multi-parameter lighting features. The modelling system and method may be used to write lighting cues in advance.

Using the general purpose computer 20 embodying the graphics generating system and software the programmer/designer can develop a working model of a lighting system configuration and its surrounding environment. The programmer defines the spatial environment, e.g. the theatre or arena, in which the lighting equipment will be used. In addition, the programmer defines each of the elements that comprise the lighting system, stage environment and targets to be illuminated. Using the modelling software to generate a graphical display of the lighting system on monitor 24, the system is capable of creating and manipulating the defined objects.

With the modelling system of the present invention, all that is required to develop the model is knowledge of the dimensions and characteristics of the arena and stage environments and a determination of the number, type, and placement of the lights to be utilized. This can be done in advance without entering the arena or hanging any lights.

Once the programmer has developed the basic model by defining the positional relationship of each of these elements with respect to other elements in a universal frame of reference, the modelling system provides for the graphical creation and manipulation of show objects and their associated attributes in three dimensions on the two dimensional display such as screen 24.

The programmer defines positional and characteristic information for each element in the model by communicating interactively with the modelling system using the mouse 28, keyboard 30, cursor 34 and other screen objects including icons 35, menus 36 and model objects 37.

Cue parameter data may be written by identifying the lights to be assigned, their shape and color, and the position of the associated targets to be illuminated. The cue parameter data may include data representing other desired beam characteristics.

After the programmer has obtained the desired lighting effect by defining the beam characteristics and associating the necessary lights with their corresponding targets, the system can compute, if necessary, the required pan and tilt values for each light so that it is focussed on the desired target. The programmer can define the pan and tilt values either by specifying absolute values for these parameters (thus, not requiring a pan and tilt computation) or he can associate the lights with their targets. When a light is associated with its target, the pan and tilt values are computed by the modelling system. This computation involves retrieving, from a look-up table, the previously defined location of the lights and their targets in free space.

In addition to writing cue information initially, the programming instrument may be utilized to update or revise the stored parameter data. These changes are required, for example, when there is a new performance venue, or when a new choreography in the performance places the performers at different places than had been anticipated. Regardless of the reason for the change, these new values must be reflected in stored cue data. In previous programming methods this was a time-consuming and complex task.

Such updates of lighting cues are accomplished in an easy and efficient manner. If any parameter value changes, such as the position of a light source or target, other parameter data in the corresponding cue or group of cues may be revised by merely updating the model cue. This updating is performed interactively. The new parameter data is computed based on the updated information.

The modelling system additionally serves to simulate the functions of the lighting system. The display monitor 24 of the modelling computer 20 is utilized to display various graphical representations of the stored parameter data. In this manner, the programmer can observe the effects of each parameter variation.

The graphical representation of the modelling system removes the approximation and guess work from advance programming. As each parameter is varied, the programmer can see the effect it has on the entire lighting system, previewing the behavior of the entire automated lighting system as if it was set-up in a performance venue.

The modelling system also displays the configuration of each lighting instrument in any given scene (cue) in a number of ways. The display includes: a graphical representation of the lighting instruments conforming to the overall parameter data; a listing of the numerical values for one or more parameters comprising the configuration of the lighting system; a display of any given scene at random; or scenes visualizing the lighting system as the programmer steps through any given sequence of scenes or series of cues.

The modelling system can simulate the effects obtained by activating a chase (a timed, repeating sequence of cues) at the console by producing a graphical representation of the model objects conforming to each of the cues in the chase. These images are then displayed according to the inter-cue timing stored in the chase specification.

The transition from one cue to another can likewise be simulated by generating the intermediate pan and tilt settings through which the luminaires pass during the transition, producing graphical representations of the model in those intermediate states and displaying those images rapidly to create an animation-like effect of motion.

Using enhancements, the modelling system can generate a three-dimensional photorealistic image of modelled scenes. Also, by executing through a series of stored cue data, a sequence of images can be shown in rapid succession to produce the illusion of moving images. This allows the user to visualize almost exactly what the show will look like.

The modelling system includes modes which can duplicate the features and functions of the control console in the set up of the parameters of the lighting fixtures, the storage of the desired values as cues, and the recall of the stored cue data to produce the previously designed lighting effects.

The lighting designer/programmer is provided with the ability to select an arbitrary number of symbolic representations that are the building blocks of the model. These building blocks are used by the programmer to develop the model. When the building blocks that represent the stage, setpieces, targets, and trusses are selected, the programmer is prompted to specify the dimensions, support, location and rotation of the object to be placed within the model. Additionally, when lighting instruments to be added to the model are selected, the programmer is prompted to specify the channel number, support, location, and hanging orientation of the light. The process can be iterative; the modelling system permits the programmer to go back and modify the parameters for any object that he or she has defined in the model.

INTERACTION OF MODELLING SYSTEM WITH ACTUAL LIGHTING SYSTEM

Four modes of interaction between the modelling system and the actual lighting system are disclosed herein.

In one mode of interaction, the modelling system is independent and off-line from the actual lighting system. After the programmer completes the modelling and programming stages, he downloads the developed parameter data to the control console of the actual lighting system by data transfer means.

In another mode of interaction, the modelling system interactively and bidirectionally communicates with the control console of the actual lighting system. In this mode, activity in the modelling system is communicated and reflected in the console and vice-versa.

In the third alternative mode of interaction, the modelling system actually replaces the conventional control console in the control of cue set-up, store and recall. All of the functions of the console are then performed by the modelling system.

Alternatively, the functions of the modelling system can be performed by the control console itself. In the fourth mode of interaction, the modelling system replaces the lights in the actual system, responding to the controls of the actual console as the lights would. The effect of the user's manipulation of the console controls is reflected in the display of the modelling system.

GRAPHICAL VIEW OF THE MODEL

The modelling system of the present invention includes a graphical user interface to interact with the programmer. In general, the preferred interface follows the guideleines designated in *Human Interface Guidelines: The Apple Desktop Interface, ISBN* 0-201-17753-6. The interface presents the programmer with a graphical view of the model that is a clear, simple, and uncluttered representation of the current state of the objects in the model.

Lighting instruments or other objects can be created, modified and deleted in the graphical view of the model. The model objects can be displayed utilizing symbols such as "spheres" for the luminaires, blocks for the stage performers, and "rods" for the light beams and trusses. These tasks are performed by the programmer, preferably by means of executing menu-driven commands. These functions will be addressed in greater detail below.

The modelling is carried out with the aid of a programmable general purpose computer such as shown in FIG. 1. A preferred model is the Apple Macintosh II fx.

Computer 20 houses the usual complement of a processor, ROM memory, drives, busses and control circuits and the modelling system.

A typical graphical input device 28 such as a mouse, joystick, tracker ball, or light pen, together with the menu system and cursor 34, allows the programmer to interact with computer 20. Mouse 28 is the preferred graphical input device for pointing to information on display monitor 24. Alphanumeric keyboard 30 provides the usual functions and also serves as an alternative data entry means.

In the preferred embodiment of the present invention, menus are utilized to allow the programmer to efficiently choose an item to be incorporated or updated in the model, or to alter the operating mode of the system. The menus are also utilized to present to the programmer only the legitimate alternatives available, thereby precluding invalid choices. The menus also ameliorate the need to remember command names and give the programmer an overview of all of the alternatives.

Figure 2A:
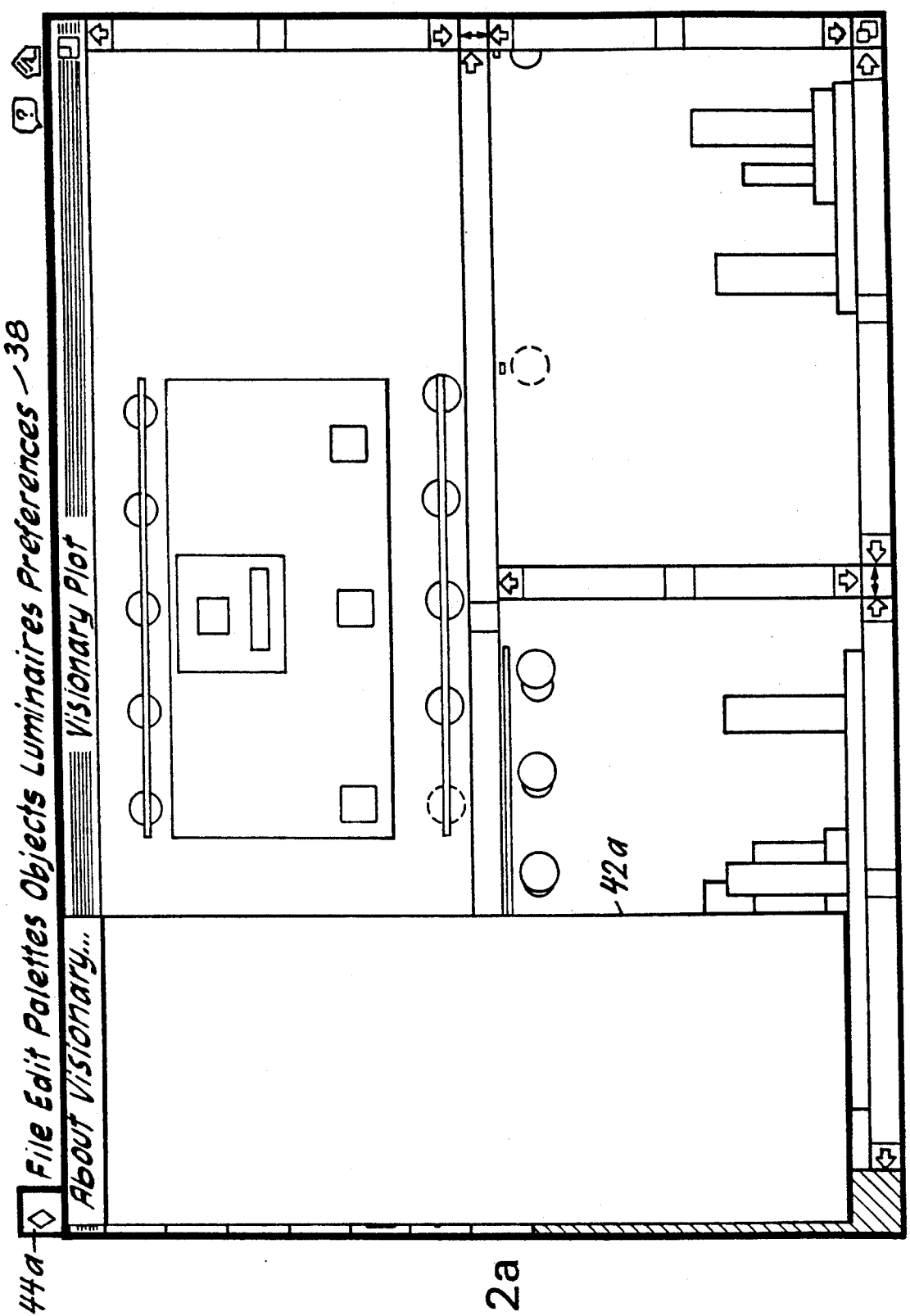
FIGS. 2A through 2G display a series of monitor screens and associated menus.
Figure 2B:
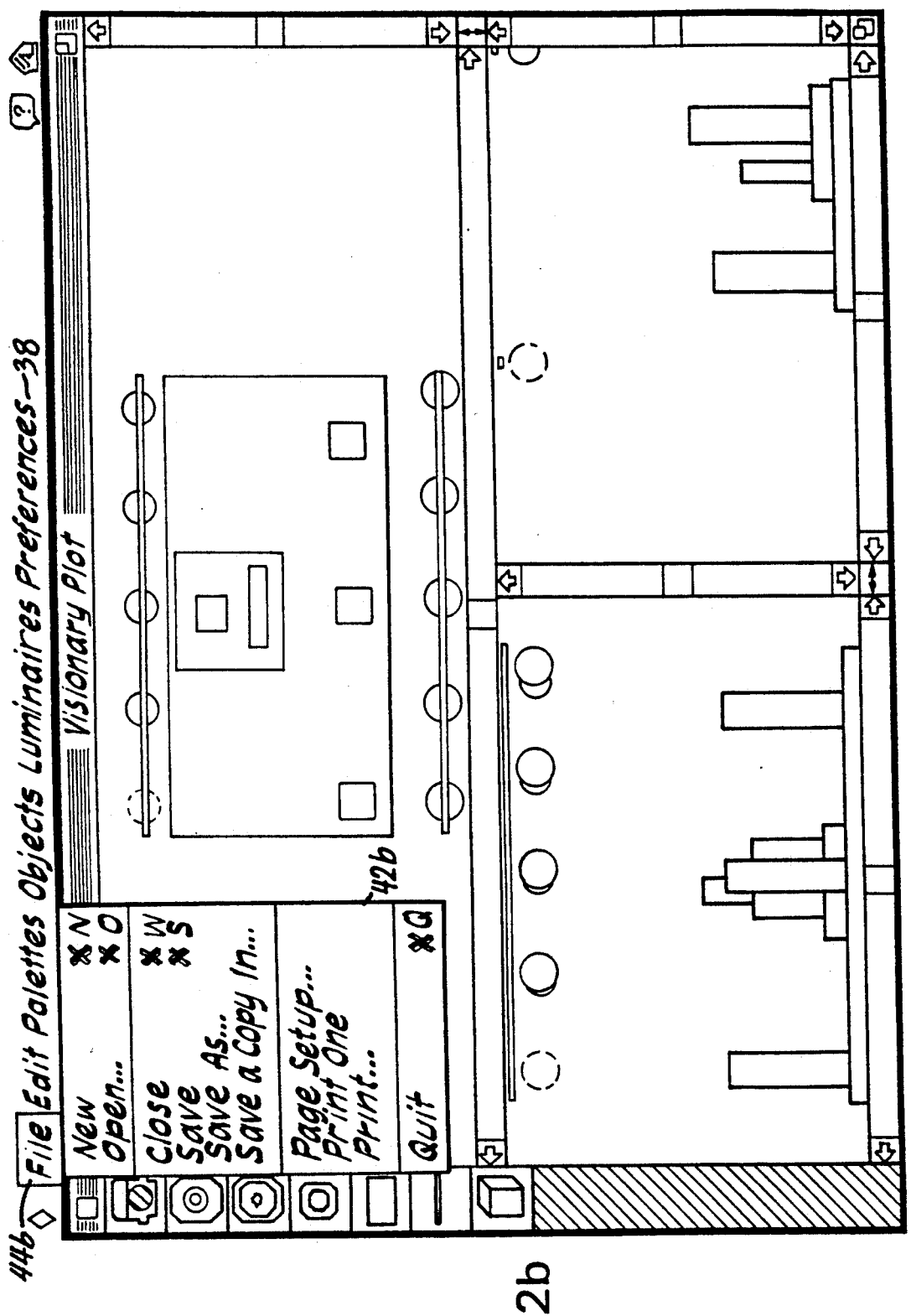
Figure 2C:
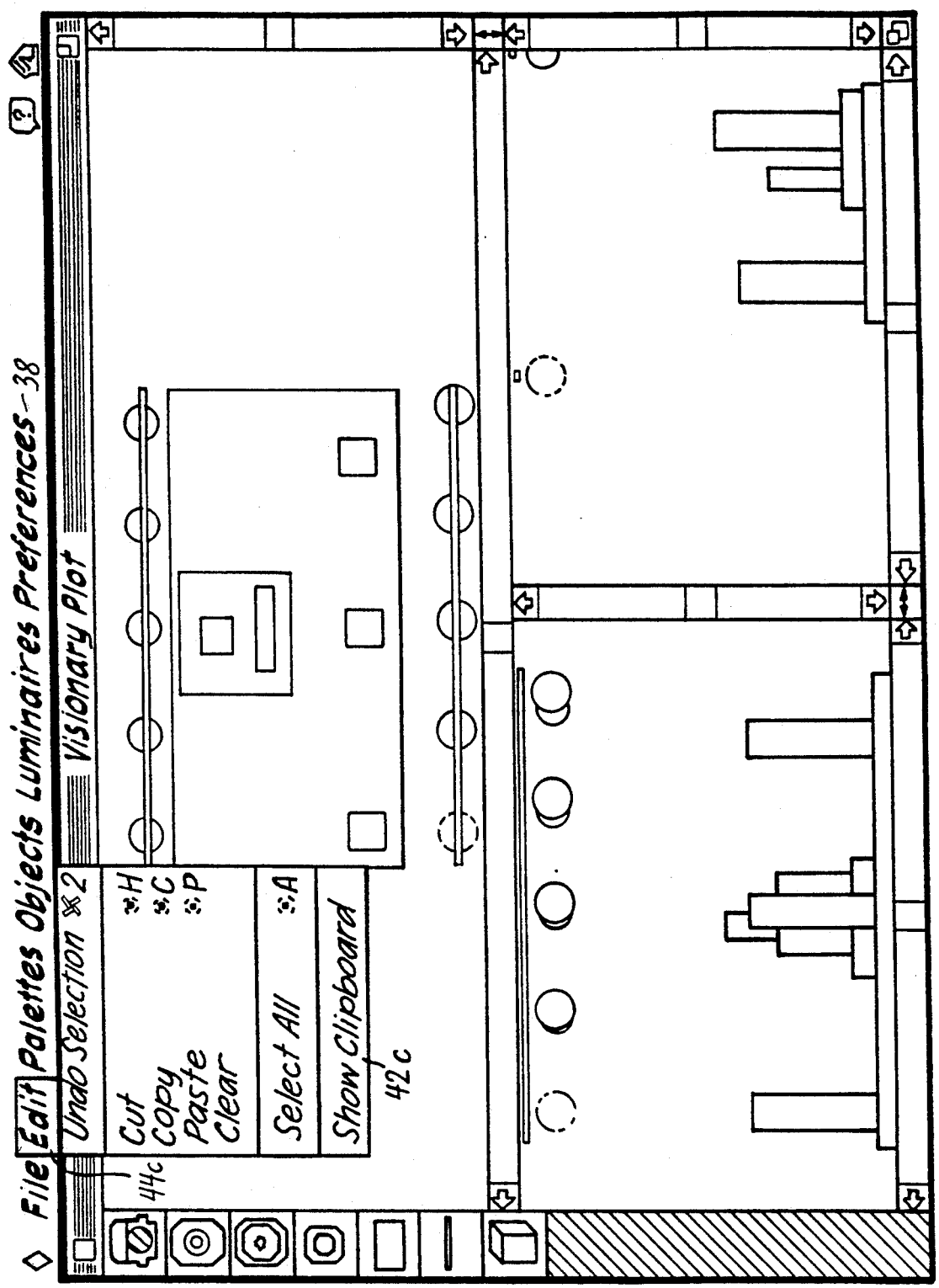
Figure 2D:
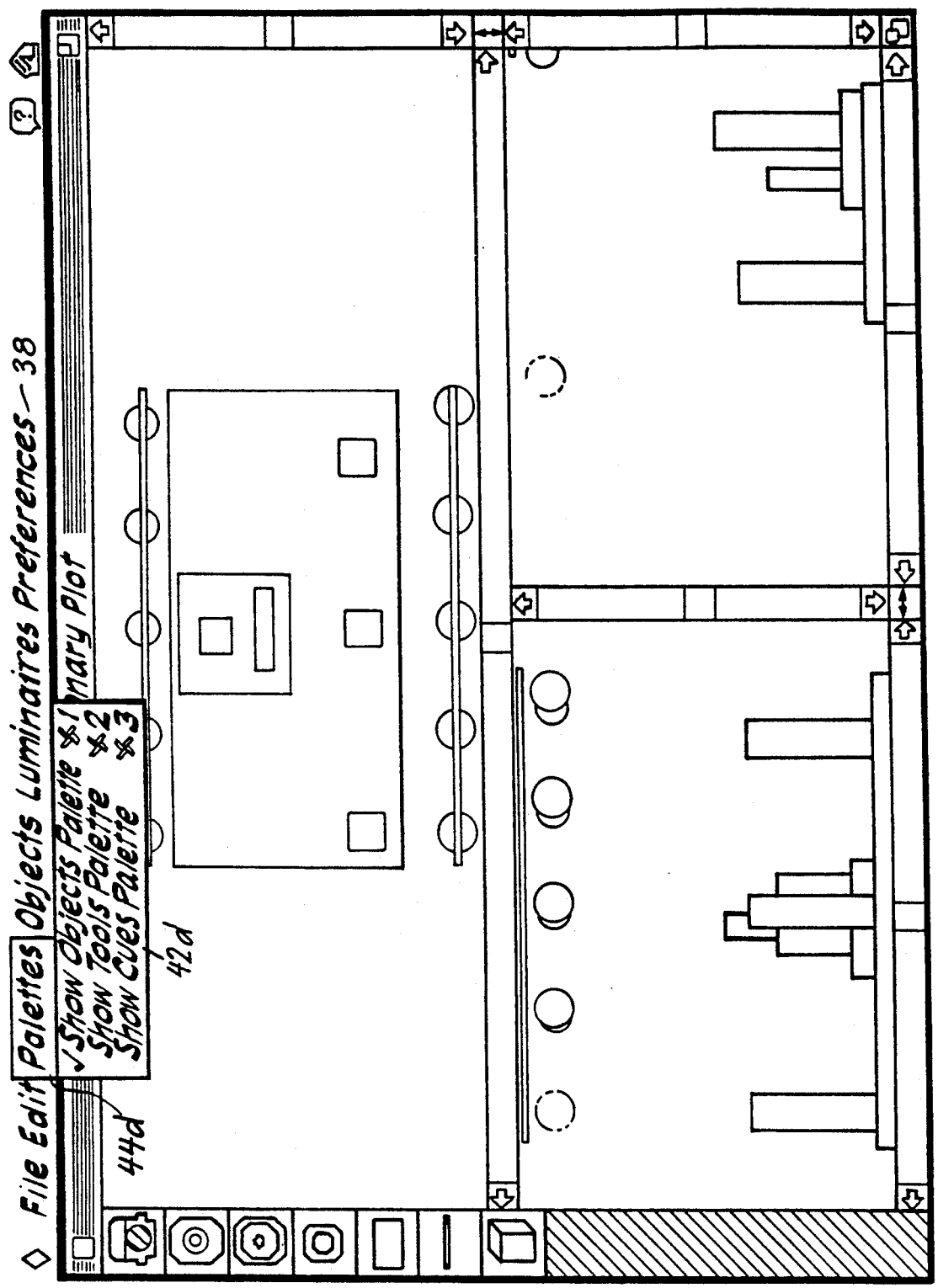
Figure 2E:
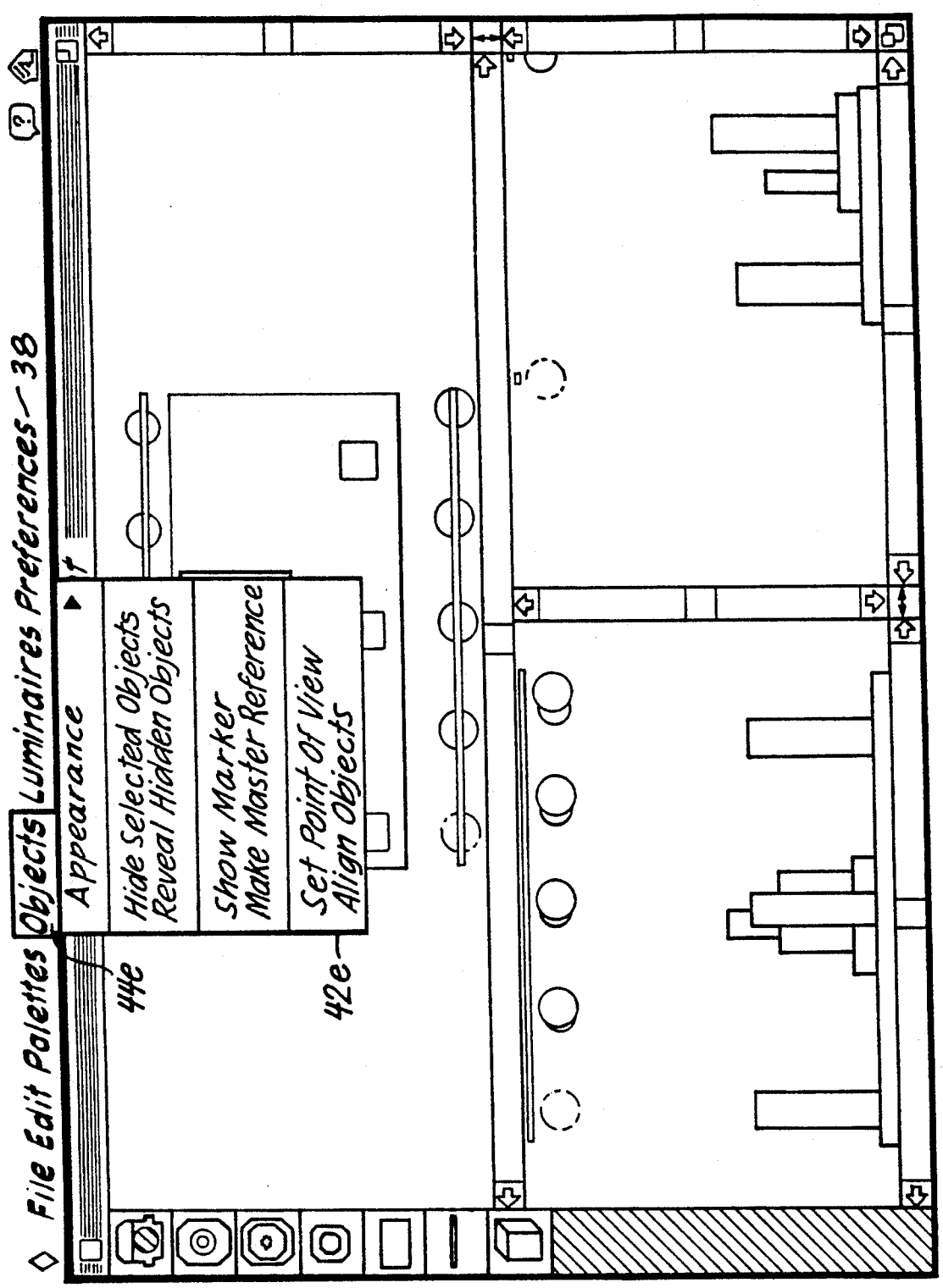
Figure 2F:
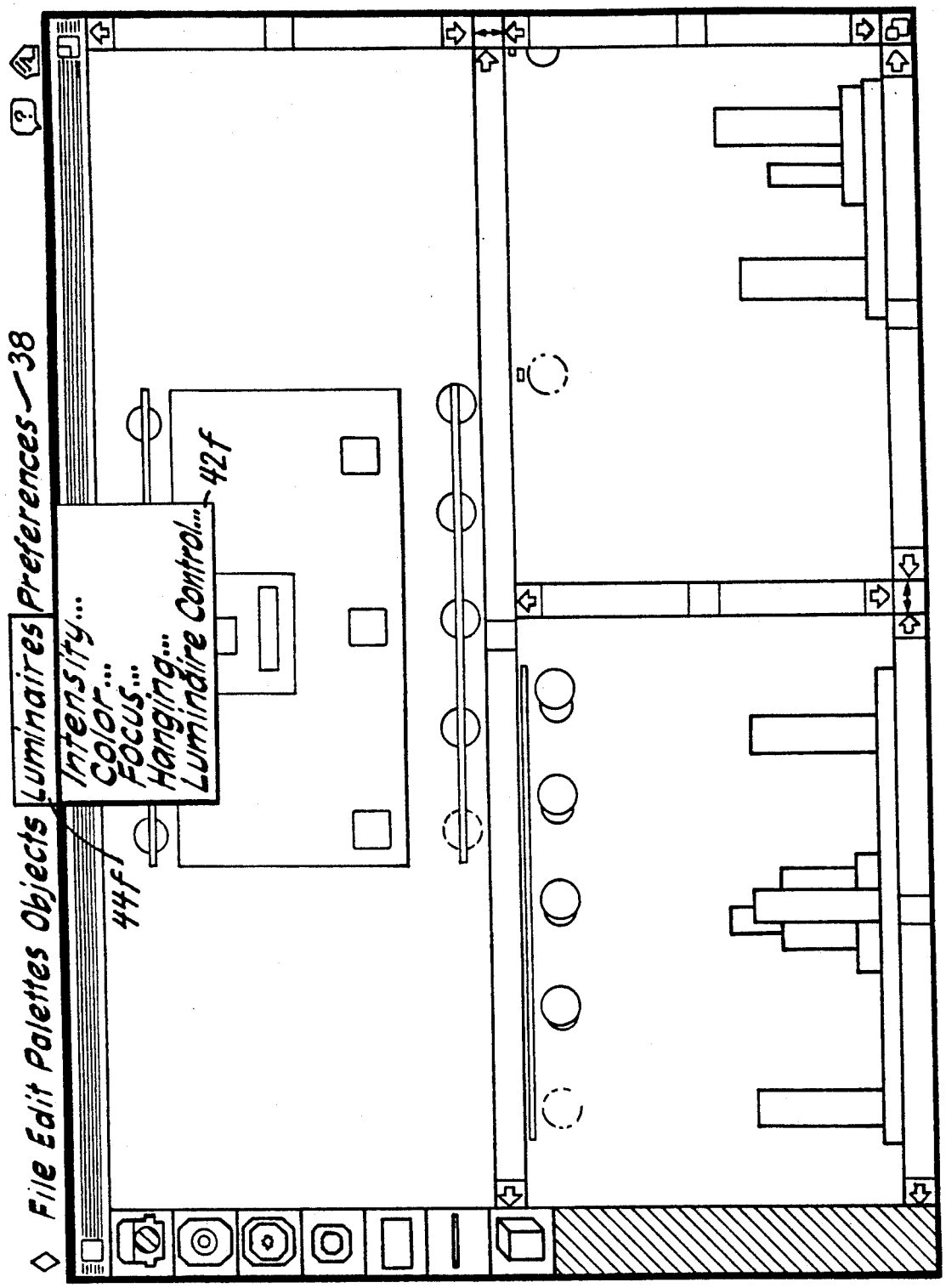
Figure 2G:
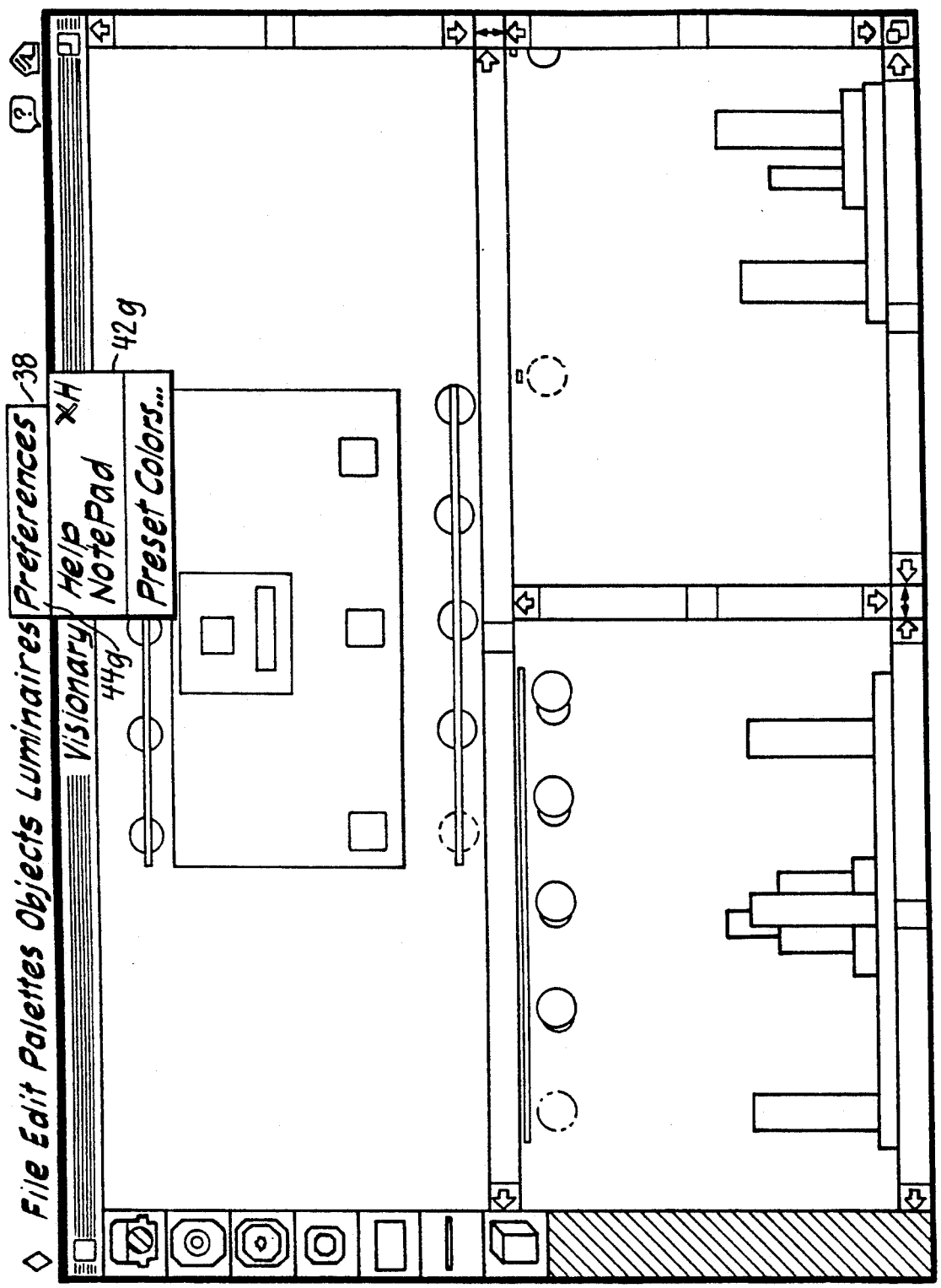

FIG. 2a shows a typical graphical display of a lighting system on display monitor 24. A "menu bar" 38 lists the names of typical pull-down menus 44 *a-g*, from which the programmer may select commands as shown in FIGS. 2a-2g. When the programmer selects a menu to be displayed from the "menu bar" 38, alternative commands are presented for further selection. The selection process and the individual pull-down menus 42 *a-g* are discussed in greater detail below.

As the programmer builds the graphical model that represents the lighting system and surrounding environment a corresponding master data base is created and stored in the memory of computer 20. The master data base stores the parameters and attributes that define the objects that are represented in the model. As the programmer adds an object to the model, a record for that object is created and stored in the master data base. As discussed below, each record has a field for each of the attributes of the object that need to be defined during the modelling and programming process.

The image that is seen on display 24 as the programmer builds the model through an interactive graphics process is stored in the underlying master data base in digital memory as a matrix of values. The screen image is stored in a frame buffer as a pattern of binary numbers representing an array of picture elements (pixels). As changes are graphically made on display 24, the records created in the digital memory are modified to represent the current state of the graphical model.

As the programmer models and programs the lighting system, monitor 24 displays a view of the lighting system and stage environment and shows the programmer the results of adjustments to the lighting parameters. The programmer can observe the effects of changes in color, pan, tilt, beam size, edge, and intensity on the overall lighting effect. Other effects, e.g., gobo selection, are also represented in a similar manner.

Figure 3:
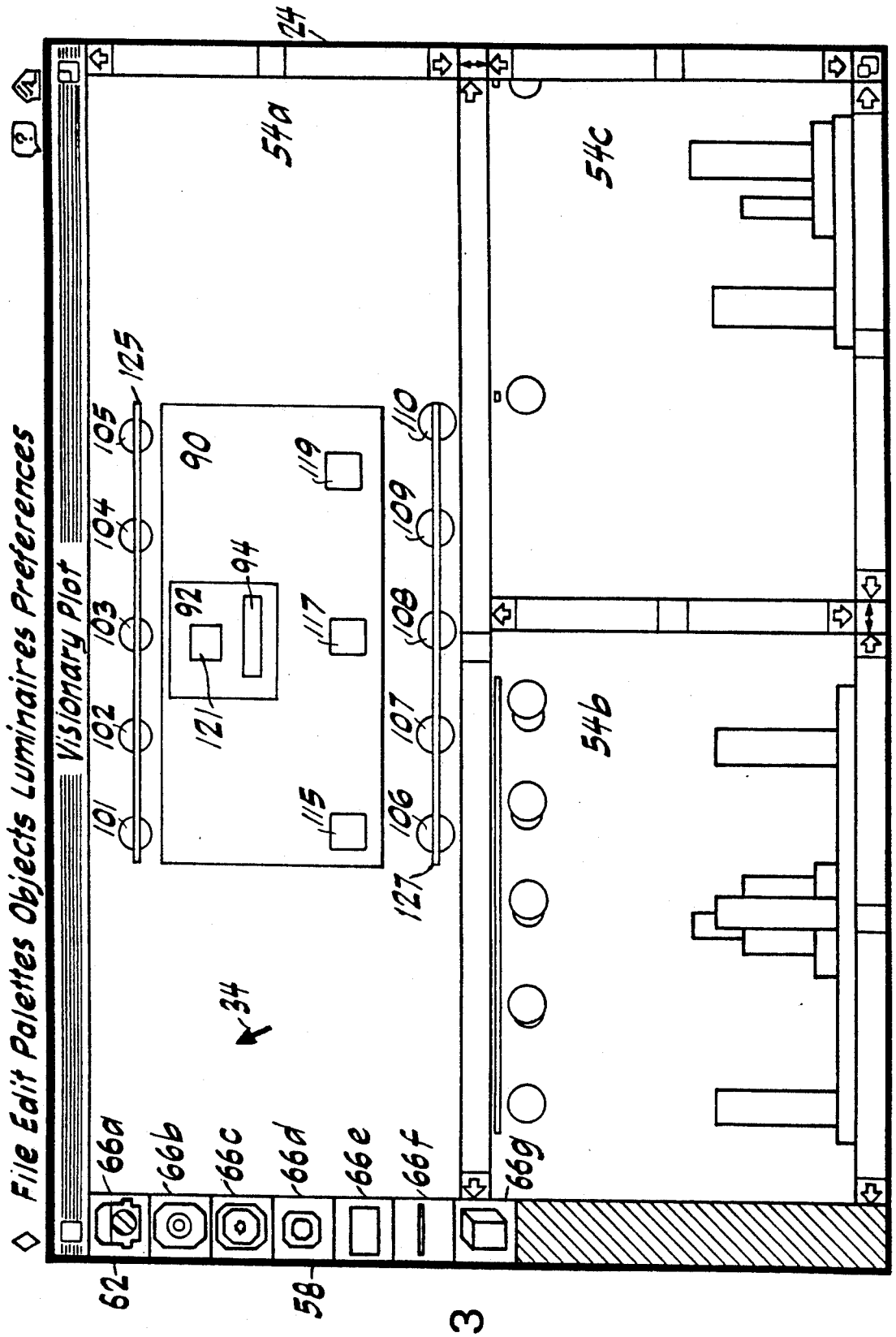
FIG. 3 is a view of the monitor screen showing the objects palette.

FIG. 3 illustrates the display on screen 24 of windows 54 *a-c*, which are plan, front and side elevation views respectively, of the model. In one preferred embodiment, the display utilizes up to four windows to give the programmer the ability to observe the lighting effects from these views, and a perspective view from another selected point (not shown).

Before a portion of the master data base may be displayed in a window, it must be suitably clipped against the limits of the window size and then mapped to the display to achieve the desired size. The programmer can manipulate the windows, allowing him to move them, overlap them, or resize them. These processes do not affect the underlying information from the master data base that is being displayed, but only the programmer's view of it. As in standard window applications, display management permits the programmer to open, close, move, size, scroll, or zoom the windows. Zooming is achieved by introducing a scaling factor. If the programmer wishes to zoom in on a particular area, the coordinates are scaled up by a suitable factor and clipped against the window limits.

The programmer is presented with the largest view of the lighting system and stage environment when the window size is defined to surround the set of all objects defined in the lighting system and surrounding environment. When the window (e.g., 54a, 54b, or 54c) is defined to be smaller than the scene image, the clipping process is performed. The clipping process tests to see which objects are contained within the selected window, and then proceeds to clip those objects that lie on the window border and outside of the window before the image is mapped to the display screen 24. The portions of the image that remain after this process are then mapped to the screen 24. When a window (such as 54a, 54b, or 54c) is chosen to be smaller than the entire scene, it allows the remaining image to be displayed at a scale that is larger than if the entire scene were displayed. This magnified view can be used to show more detail of elements of the model.

The programmer is able to hide selected objects on the screen in order to reduce the visual clutter in the graphical view of the model. Objects that are hidden in the graphical view are still maintained in the underlying data base and will appear in the spreadsheet view (discussed below) with a column indicating their shown or hidden state. Hidden objects will remain hidden until the user commands selected objects to be shown again. Although certain objects may be hidden in the display view, they may still serve as targets for the lights and as supports for other objects. To hide a selected object, the 'Hide Selected Objects' command is selected from the 'Objects' menu 44*e* in FIG. 2*e*. As mentioned, the object will no longer be represented in the graphical view, but its records will be maintained in the underlying data base.

In order to distinguish objects, the programmer can change the color of a graphical object. The means to alter the color is preferably offered in a pull-down menu. The programmer selects the graphical object to be "painted" and then selects the "appearance" command in the pull-down menu under "Objects" 44*e* of FIG. 2*e*. This command will cause a deeper level menu to be displayed on the screen that contains the alternative colors with which the object can be painted. Upon selecting a color from the list of alternatives, the selected object assumes that color.

TABULAR VIEW OF THE MODEL

In addition to presenting the programmer with a graphical view of the underlying data base as just discussed, the programmer may also display the data in a "spreadsheet" format, as shown in FIGS. 4*a* and 4*b*. This is a tabular representation of all of the attributes of the objects defined in a model. The spreadsheet can be organized by having the assigned object name or object type (e.g., a fixture such as a VL4 TM) appear as the heading of each row in the table. Attribute names such as "Focus" and "Color" can appear in the column headings. Each individual cell in the table contains the value of one attribute for a particular object. Furthermore, each individual cell can be single-valued (such as Support) or multi-valued (such as the height, depth and width components of Dimension).

The inclusion of spreadsheet columns for each attribute can be under programmer control and thus removed or added.

The programmer "hides" a column by clicking on the column heading with mouse 28 and dragging it out of the spreadsheet window. Similarly, in order to retrieve a hidden column, the programmer can double click on a column divider in the row of column headers or by selecting a column divider and issuing a menu command. Either of these actions by the programmer invokes a dialogue message that lists all of the hidden column names. The column(s) that are selected by the programmer from the dialogue message are then inserted into the spreadsheet at the location of the column divider that was initially selected.

If the programmer desires to rearrange the columns in a spreadsheet, he merely selects one or more column headers, clicking in one of the selected headings; he then drags the column(s) to the desired location and deposits it there by releasing button 29 on mouse 28. The selected columns will be inserted into the spreadsheet between the two columns separated by the column divider that was initially selected.

The programmer may be presented with spreadsheet views of the data organized in several ways. The preferred embodiment of the invention includes three different spreadsheet arrangements. This embodiment creates three versions of the spreadsheets upon the opening of a document or upon the start-up of a new modelling file. As the programmer adds elements to the model, the associated data will be included in the various spreadsheet views discussed below.

A first spreadsheet view, termed a "model window", is shown in FIG. 5a. It provides a view of the model objects and their current attributes which allows the programmer to view data that is necessary for the modelling environment, but is not represented in the cue data transferred to the lighting system. For example, in order to develop the model it is necessary to know the dimensions of all of the set pieces. However, this information is not required to perform the actual show. The spreadsheet in the "model window" can be arranged so that the user-assigned names and model types (lights, set pieces, etc.) appear in the row headings, and the names of the attributes of these objects appear in the column headings, as shown in the Figure.

A second type of spreadsheet called a "luminaire window" is shown in FIG. 5b. This spreadsheet presents the programmer with the lighting system data that he is accustomed to programming. Timing data is displayed along with flags or indicators indicating to which parameters the timing applies. This spreadsheet can be arranged so that the channel numbers or other identification of the lights are placed in the row headings and the names of the attributes of these lights are placed in the column headings. This spreadsheet represents the state of the luminaire objects in the model, and the data presented will change as cues are recalled into the lights, as well as when individual lights are manipulated.

A third type of spreadsheet called a "cue window" displays the data stored in a selected cue, regardless of the state of the luminaire objects in the model. This spreadsheet can be arranged so that the channel number or other identifier of the lights appears as row headings and the column headings contain the names of the attributes of the lights. The cue number and additional data stored with the cue related to console functionality are also displayed. The programmer may select whether the attributes of all the lights are shown or only those lights that are active in the selected cue. This spreadsheet can be switched to a "tracking" view of the cue data, presenting the viewer with only the cue data which has changed value from the previous cue (or from any arbitrary cue).

The rows of any spreadsheet can be sorted in a number of ways. The rows of the "luminaire" and "cue" windows, comprised of luminaires or dimmer channels, can be sorted by their channel number. Alternatively, the rows can be arranged so that all of the channels of similar luminaire types (VL2B TM, VL3 TM, VL4 TM, etc.) can be grouped together, and then can be secondarily sorted by channel number.

The row headers of the "model window" contain the symbolic names of all of the objects in the model. This spreadsheet can be sorted alphabetically by object name for non-luminaire objects and by channel number for the luminaires. Alternatively, the rows can be grouped by object type (e.g., target, luminaire, etc.) and secondarily sorted by name.

The program design also permits the programmer to establish spreadsheet templates that may be used to reformat a spreadsheet or utilize previously established spreadsheet formats. A programmer can create a spreadsheet template by placing a spreadsheet window in the front window on display screen 24 and executing a menu command to create a template of that spreadsheet's format. The menu command invokes a dialogue message that allows the programmer to attach a symbolic name to the template. To store a template, a document is created in memory and written to disk that contains the template name, the spreadsheet type (model, luminaire, or cue window), the object types displayed in the spreadsheet (row headings), their associated attributes (column headings), and the order of these attributes.

Once the programmer has established a desired template he is able to call up a spreadsheet to the front window of display 24 and execute a menu command that is available to reformat the spreadsheet according to that template (or another if he wishes). Upon execution of the menu command, the programmer is presented with a dialogue message containing a listing of all of the available spreadsheet templates that are appropriate for that type of spreadsheet (e.g., model, luminaire, or cue window). A selection can then be made.

The programmer has the means to open and close any of the spreadsheet windows. Additionally, when the information contained in a spreadsheet view exceeds the available display area, the scroll bars on display 24 are enabled that allow the programmer to show portions of the document not currently displayed.

Objects can be created, modified and deleted within the spreadsheet view of the model. Object attributes can be changed in a spreadsheet view with the same menu commands and dialogues used in the graphical view or by selecting one or more cells and entering a new value at the keyboard. As in other modes, new values entered from the keyboard are automatically checked by the system for errors. Almost all of the attributes of the modeled objects can be modified in this manner.

The objects that the programmer wishes to alter in the spreadsheet view must be activated or selected before they can be operated upon. An object can be selected in a spreadsheet window by clicking on the appropriate row header describing the object. A group of objects can be selected in the spreadsheet view by depressing the button 29 on the input device 28 and dragging the cursor through the desired range of object row headers. As the cursor is dragged, the objects included in the range can be highlighted. Cells representing individual attributes of individual model objects can be selected similarly. Changes made to the model objects are reflected automatically in all open spreadsheets, in the graphical view and in the underlying data base. Dialogues are accessible in the "model window" to control those attributes which, in the Graphical view, are modified through direct manipulation of the object images. The user is able to manipulate cue data already in the "cue window" spreadsheet. Additionally, the programmer can add lights to the cue by specifying all parameters for the light to be added.

The programmer can copy attributes of one object and then "paste" or copy them to another. The programmer merely selects the cells containing those attributes, according to the methods described above, and copies the attributes to a buffer window on the screen (i.e. a "clipboard"). To paste, i.e., transfer, the information that has been copied into the buffer to the receiving object, the programmer selects cells, such that the highlighted cells assume the attributes that were copied into the buffer. If the programmer tries to paste an attribute into an incorrect cell, a warning message is activated.

The buffer window can be accessed or viewed at any time by a menu command. The only time that data in hidden columns will be copied into the window buffer is when the programmer has selected the entire row by clicking on the row header.

The programmer can also review the data by means of a "browser" which supplies the programmer only with information requested from the underlying stored data base. This method of data presentation is very efficient, as it does not require the programmer to "navigate" through all of the data contained in the spreadsheet. The programmer merely has to specify the parameter data that he would like to see and only that data is displayed.

HIERARCHICAL FRAME OF REFERENCE

A multi-level frame of reference can be established in the model for the purpose of assigning and editing positional information. The creation of a number of levels in the universal frame of reference facilitates this entry of required positional information. As the programmer selects an object to be included in the model, he is required to enter the symbolic name for the object that supports the object being added. In this manner a hierarchy is developed that identifies the "tree" of supports.

In this type of hierarchy, the principal level or master frame of reference in the overall model is the performance venue, which is defined by its boundaries and incorporates everything within it. The screen boundaries of the display monitor can imitate the boundaries of the stadium or performance venue. When the programmer adds an object that is in the venue level of the hierarchy, he can specify that the added object is supported by the floor or roof. The next level in the model hierarchy is the objects which are supported by the floor/ceiling, which may be placed anywhere within the venue frame of reference. The subsequent level in the model hierarchy is comprised of the set pieces, which include all of the structures used in the performance such as the drum risers, ramps, or any other scenery that is used in the performance. The position of these set pieces may be assigned with respect to the venue, stage or other set pieces that have previously been defined. The final level in the modelling hierarchy is the performers; they may be specified with respect to anything that has been defined in the arena.

The programmer may enter data while working in any level of the hierarchy, and it will be reflected in each of the other levels. For example, the programmer can specify that a light will be focussed on a performer located on the drum riser for a particular cue. The model determines the position of the drum riser with respect to the universal frame, and then computes the position of the performer within the universal reference. This in turn defines the light positioning.

When the programmer moves a support to a new position within the model, all of the objects that are supported by the moved object should also move. When the programmer deletes an object that serves as a support for other objects, all of the things that were supported by the deleted object become supported by the deleted object's supporting object.

The programmer can also specify that an object is "bolted to" its support, indicating that when the object is moved its supporting object will also move. When the supporting object moves any other objects supported by it will also move, as described above.

BUILDING A MODEL OF THE LIGHTING SYSTEM

Menu of Building Block Elements

When initially building the model, the programmer can be presented with a menu or listing of building blocks or symbolic representations for all of the elements that would likely be placed in the lighting system model. This building block menu, similar to a legend or key, is presented as a separate screen, a pull-down menu, or a window on a portion of the screen. As shown in FIG. 3, when presented with this menu of building block alternatives, the programmer can designate his building block choice to computer 20 by manipulating mouse 28 so cursor 34 points to his selection from among alternatives 66 *a*–*g*. Selection of this building block is by depressing key or button 29 provided on mouse 28. The selected "icon" will be distinguished from non-selected items. If a pull-down menu system is utilized to access the building block menu, the programmer must first access the pull-down menu by selecting the menu from menu bar 38. In the preferred embodiment, the building block menu (or "objects palette") is accessed by selecting menu 44*d* in FIG. 2*d*. Thereafter the programmer "drags" the cursor down to highlight the "show objects palette" option. The building block menu then appears in a window on the screen.

Once the programmer has accessed the list of building blocks he can begin selecting the desired objects to be included in the model. A typical legend menu 62 is shown in window 58 of FIG. 3. The legend screen or menu 62 comprises symbolic representations 66 *a*–*g* or "icons" that are small pictures that represent available elements that can be used in a typical lighting system. The modelling system can be programmed with a directory of the symbolic representations of elements that are common in lighting systems and the surrounding environments, this directory being stored in computer 20. The directory is accessible to the user so that it can be updated by adding or deleting elements as necessary.

Upon the selection of a building block element by the programmer, a record is created in the underlying data base in the storage means of computer 20 to store all of the necessary information for that object. Preferably, the records are broken down into fields for each attribute of the object that is to be stored. As will be discussed below, when the programmer selects an icon the modelling system will know what that icon is, and it can create a record in the memory specifically designed for that type of object. The created record will have fields for every attribute that must be known in order to completely model and program each object. The record creation will be discussed with respect to each building block element below. The information that is created in the memory records during the creation of the model helps to facilitate the cue writing process.

LIGHTING INSTRUMENTS

Icons 66 a–d in the building block menu of FIG. 3 are symbolic representations of various lighting instruments that can be utilized in a lighting system. In a preferred embodiment of the invention, each type of unique lighting instrument is assigned its own symbolic representation. In the legend menu 62 of FIG. 3, each of the elements 66 a–d represent different lighting instruments.

For example, icon 66a represents a standard conventional light that is focussed by hand and whose intensity is controlled by an external dimmer. If the programmer clicks on icon 66a to select a conventional light for inclusion in the model, a record will be created in the underlying data base with appropriate fields and the programmer will be prompted to enter the information that is necessary to define the conventional light. Upon selection of a conventional light, the programmer is prompted to enter the channel number identifying the light, the symbolic name of the support from which the conventional light will hang and the positioning of the light relative to its support.

This information is stored in the appropriate fields of the record associated with this modelled object. Since conventional lights only offer variable intensity control, a field is created in the record to store the intensity value. The record created upon selection of a conventional light can also include such fields as channel number, object type, supporting object, translation (x,y,z translation with respect to its support), rotation (x,y,z rotation with respect to its support), focus (pan and tilt values that will not change with the recall of cues), color (value won't change with the recall of cues) and intensity (representation of the value of the control signal (0-100%) that is sent to the dimmer device to which the luminaire is connected). All of the fields except for intensity are generally defined once the programmer has included and defined the light in the model.

Automated lights can also be assigned unique symbolic representations such as the icons 66 b–d, FIG. 3. As in the case of a conventional light, the selection of an icon 66b–66d (representing an automated light) establishes a record in computer storage with the appropriate fields and the programmer can be prompted to enter channel number, support, and position relative to the support associated with the light for entry into the associated fields.

In one embodiment, icon 66b represents a Vari-Lite "VL2B TM" model; 66c represents a Vari-Lite "VL3 TM" model, and 66d represents a Vari-Lite "VL4 TM" model. Since the modelling system is programmed to recognize the type of lighting instrument that is selected when the programmer clicks on an icon 66 a–g; the record associated with that selection has fields to store all of the information for that object. Thus, the records for an automated light contain fields appropriate for each of that type of light's unique attributes (e.g., channel number, object type, support, translation and rotation with respect to the support, intensity, focus (pan and tilt components), color, beam angle, gobo, and edge).

Orientation

When defining a selected lighting instrument in the model, the programmer must specify the orientation of the lamp with respect to its support. The standard practice of hanging lights orients them so that the pan axis is vertical and the light can focus straight down. However, the lighting designer may desire to orient a light in a non-conventional or random manner. Since the orientation of the light has a direct effect upon the pan and tilt calculation, the programmer must specify the orientation of every light.

The programmer can be prompted to enter the orientation of a light each time he selects a light from the list of building blocks, or the orientation can be set to default values which are changed if the programmer enters different values. The programmer can define the orientation by selecting a light and accessing an orientation dialogue box. In the preferred embodiment, the programmer can enter the orientation of lights which are hung in a non-conventional manner by means of a pull-down menu. Upon accessing the orientation or "hanging" selection of pull-down menu 44f in FIG. 2f, a dialogue box will prompt the programmer to update the orientation values. Every record associated with a light should have a field that stores the orientation of the light with respect to its support.

ADDITIONAL MODEL BUILDING BLOCKS

Icon 66e in FIG. 3 represents the symbol used to model the stage and related platforms (such as a drum riser). When the programmer selects that icon, a record with the appropriate fields is created for the object in order to store the necessary information. The record includes fields for the symbolic name for the selected object, the object type, dimensions (length, width, and height), support, and its position and rotation with respect to its support. The programmer is prompted to enter these values during the modelling and programming processes for inclusion in the object's appropriate field.

If the set piece is not a rectangular solid additional fields are included in the object's record to mathematically define its shape.

Icon 66g is a symbolic representation used to model performer-target, such as singers or drummers. Upon selection of icon 66g, a record with appropriate fields is created to store the information required to define this object. Similar to the records created for stage pieces, fields are created within the record which include the symbolic name, object type, dimensions (length, width and height), support, and its position and rotation with respect to the support.

Symbol 66f represents the truss elements on which the lighting instruments may be hung. Upon selection of icon 66f a record with the appropriate fields is created for the truss. The fields necessary to define a truss element include the symbolic name, object type, length of the pipe, and its position and rotation with respect to its support. Additionally if the truss is comprised of two pipes the programmer can record the distance between the two pipes. Upon selecting icon 66f the programmer is requested to enter the appropriate information.

Additionally, the programmer can be offered other basic items for the development of symbolic representations for unique stage props. By combining the building block elements the programmer develops his own representations for numerous stage objects.

Since many set designers and lighting designers use computer-aided design tools such as AutoCad (sold by AutoDesk, Inc., 2320 Marin Ship Way, Sausalito, Calif., 94965) to design sets and lay out lighting systems, the modelling system of the present invention can receive the data from such CAD programs describing the name, dimensions, supporting object, position and rotation of the model elements.

SUMMARY

The foregoing steps are summarized below.

1. Selecting and Defining Elements

The programmer uses the basic building blocks of the legend menu 62 to define the entire model for the lighting system. Upon selection of a building block element by clicking on it the programmer is prompted to supply the information needed to define the building block element.

Alternatively, the programmer can select a building block by entering an alphanumeric character on keyboard 30 that is associated with that element.

As information is retrieved from the programmer it is placed in the appropriate fields of the record associated with the selected model object.

Figure 6:
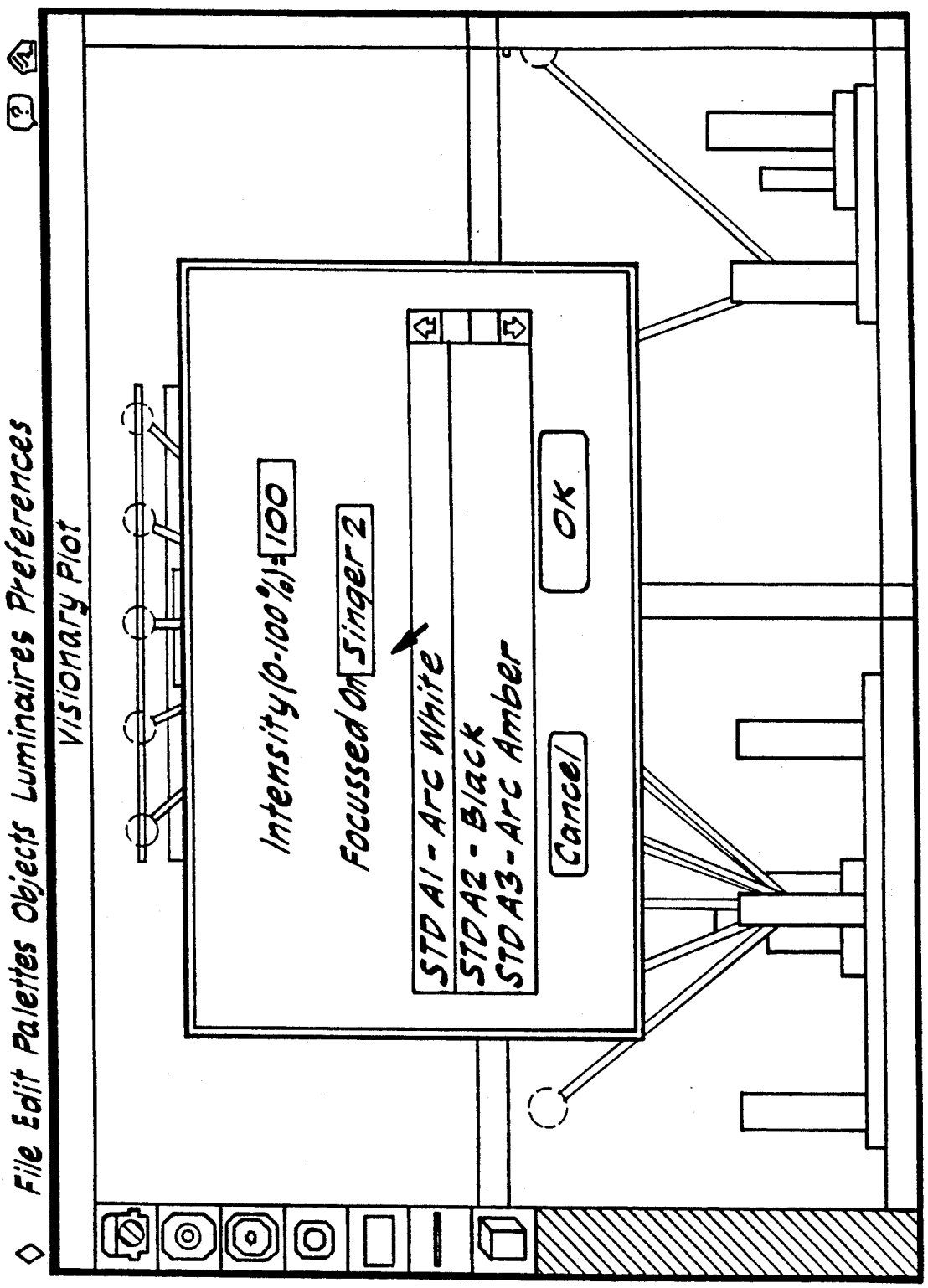
FIGS. 6, 7, and 8 illustrate the monitor screen and various manipulation dialogs.
Figure 7:
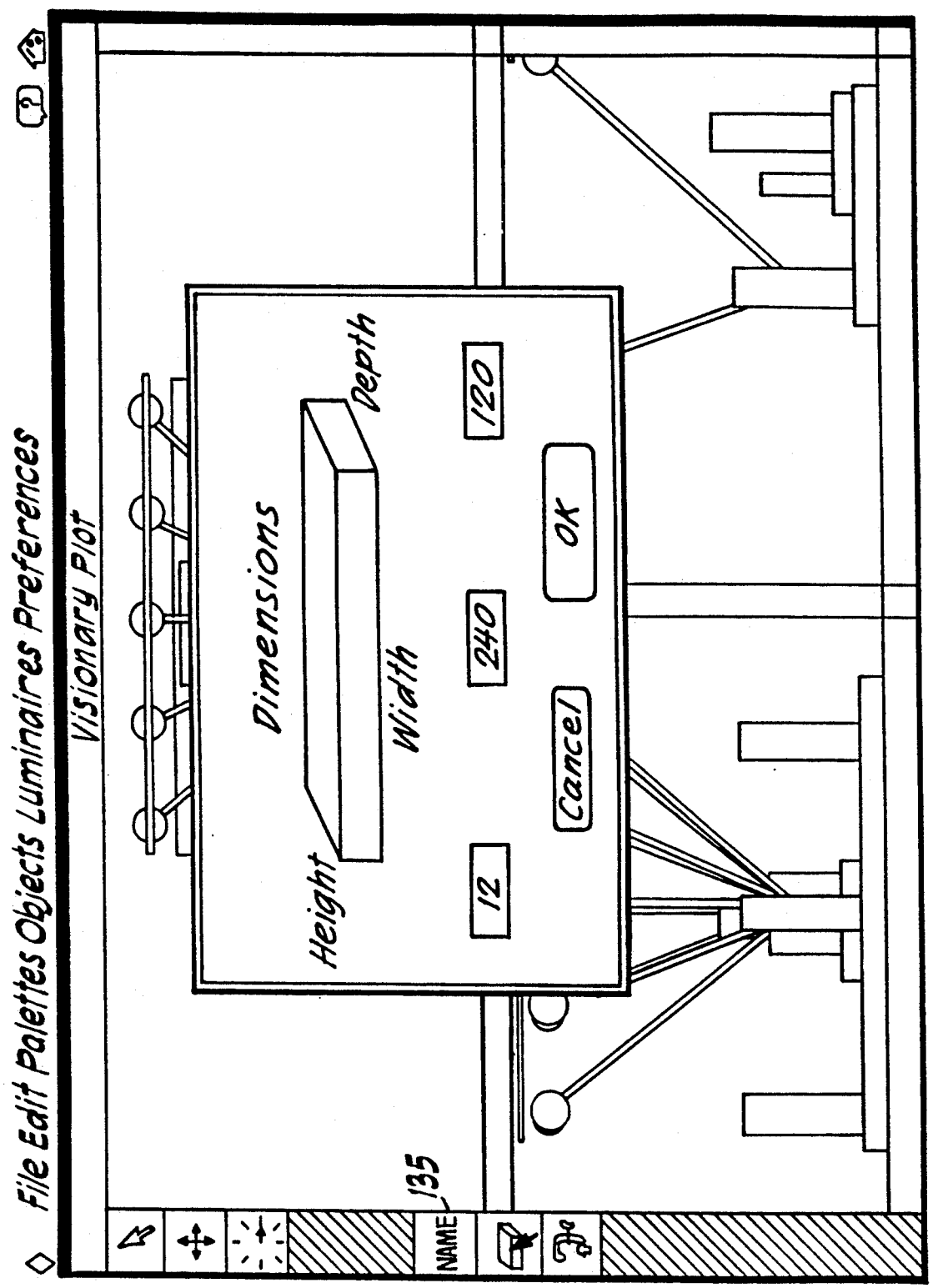
Figure 8:
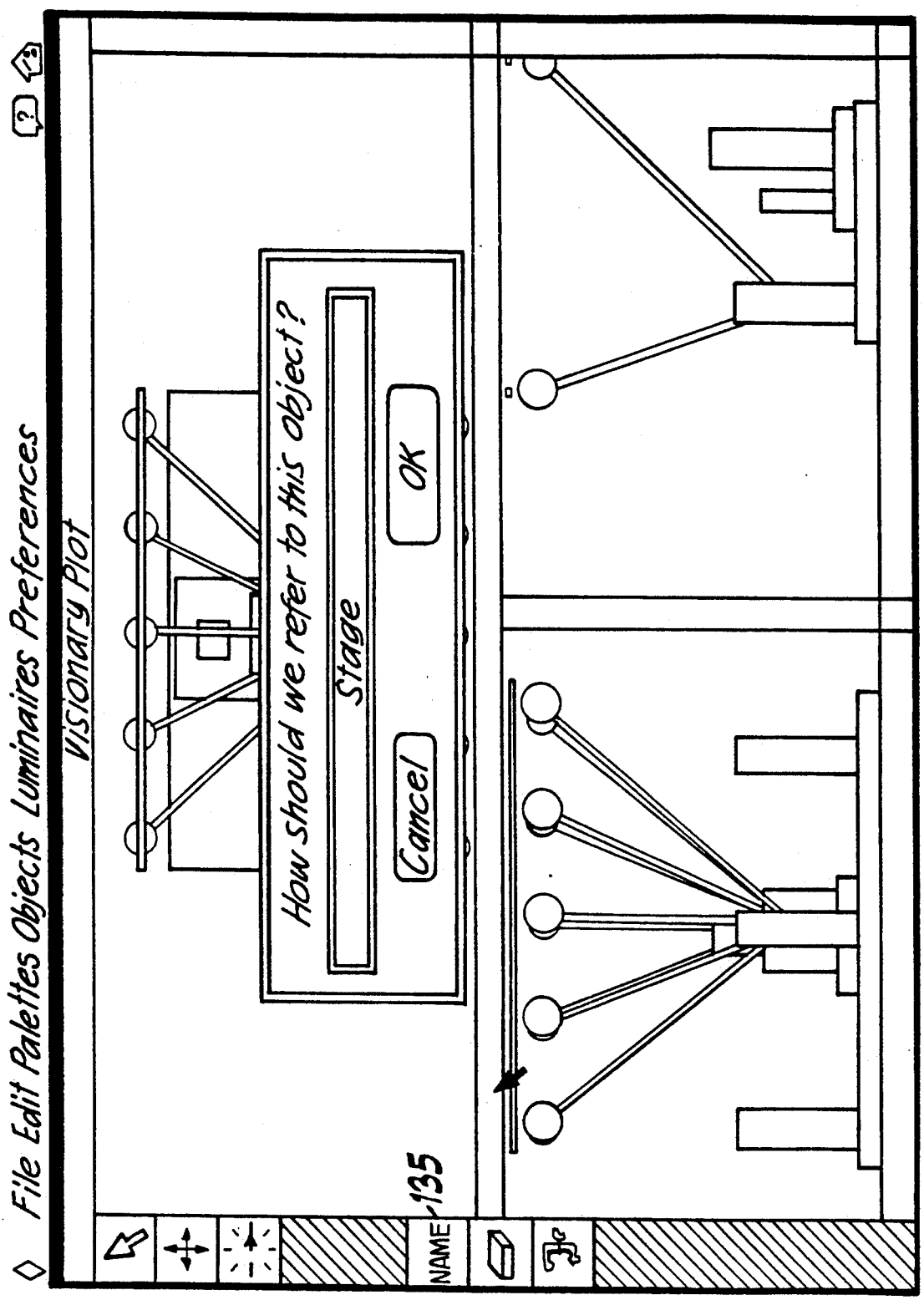

An efficient method of prompting the programmer to retrieve necessary definitional information is by means of "dialogue boxes". Typical dialogue boxes are shown in FIGS. 6-8. The dialogue box is a window that can be used to contain text or symbolic representations.

Once the programmer selects a building block element from legend menu 62, the modelling system will recognize the type of object selected (e.g., truss, target, VL4 TM, etc.) and can retrieve from memory any previously-stored characteristics or other information describing that object. This minimizes the information that must be entered by the programmer and maximizes the operating efficiency.

2. Assigning a Symbolic Name

The programmer can also use the dialogue box or other data entry means such as keyboard 30 to attach a symbolic name to the graphical object that he has selected. During the programming process the symbolic names provide the programmer with an easy means for identifying particular targets and elements within the lighting system. For changing a defined symbolic name, the programmer can select icon 135 of FIGS. 7-9, causing a dialogue box to be presented on the screen. The dialogue box will show the programmer the symbolic name that is presently associated with the selected object and allow it to be updated. The "name" icon 135 can be accessed by means of a pull-down menu or by a palette of tools presented in a window on a portion of the display as shown in FIG. 9.

3. Defining Dimensions

After selection of a building block, the programmer is prompted to enter its dimensions. In the preferred embodiment, the dimensions of the lighting instrument building blocks shown as 66 a-d of FIG. 3 are pre-programmed and the programmer will not be prompted for their dimensions. However, when the programmer selects any of building block icons 66 e-g he will be prompted for the dimensions of the selected object. The entered information is placed in the appropriate fields in the record created for the model object.

Figure 9:
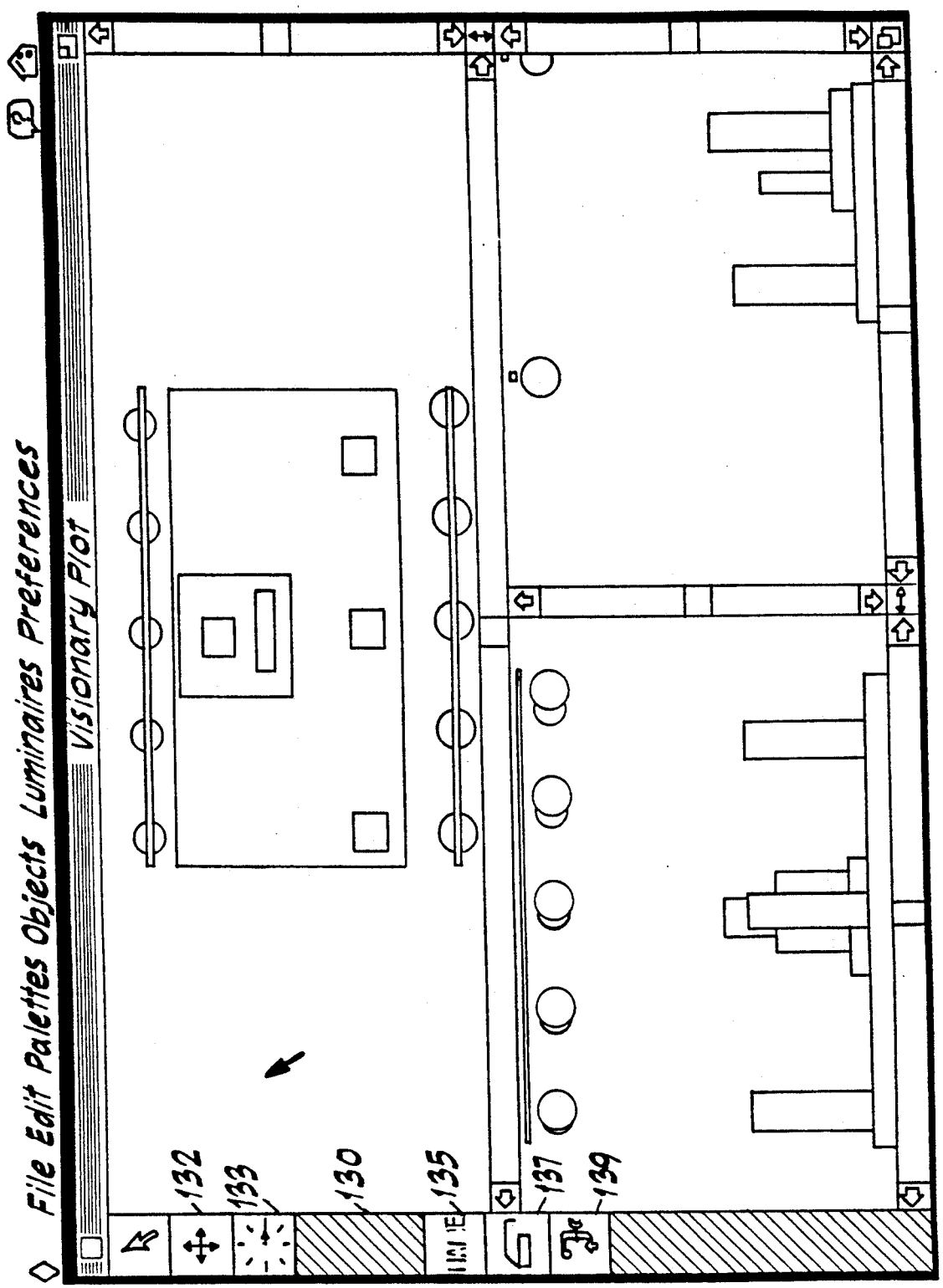
FIG. 9 is a view of the monitor screen showing the tools palette.

In the preferred embodiment, the programmer can update previously defined dimensions of a selected model object by selecting the "dimension icon" 137 of FIG. 9. Upon such selection, a dialogue box will be presented with the dimensions of the selected object. The programmer will be able to update the presented information.

4. Defining Supporting Object

In the preferred embodiment, the programmer is provided with a "support" icon 139 for updating a selected graphical object. Upon selecting a graphical object and clicking on the "support" icon 139, a dialogue box is presented containing the symbolic name of the object that supports the selected object. Thereafter, the programmer will be able to change the supporting object. The "support" icon 139 can be accessed by means of a pull-down menu or from a palette of tools 130 presented in a window on a portion of the screen.

5. Defining Positional Information

In addition to identifying and defining the characteristics for the building block object to be included in the model, the programmer also defines the position of the object within the model. After the programmer has entered all of the definitional information that has been requested, the object is initially inserted in the model in a default location corresponding to the center of the space that supports the object. For example, if the object is a target (e.g. a performer) supported by the stage, the target is placed at the center point of the stage and at zero rotation with respect to the stage. Thus, the graphical object initially has a translation of (0,0,0) and a rotation of (0,0,0) with respect to its support.

The programmer changes the position of the selected object by clicking on its image, moving the objects outline with mouse 28 to the location where the programmer would like to position the object He then enters this position by releasing button 29.

When the programmer is positioning a selected object in a multi-view display mode as in FIG. 3, he moves the object in one window, such as window 54a (a top or plan view). This process fixes the position of the object with respect to coordinates "x" and "y". The programmer then adjusts the height of the object in one of the other windows 54b or 54c to fix the "z" coordinate of the object. Alternatively, using a dialogue box, the programmer can numerically define the position of the object by specifying its location relative to a fixed location that has been defined within the model.

In the preferred embodiment the programmer is provided with a "dragging" tool 132, FIG. 9, that allows him to "drag" a selected object around the screen. The "dragger" can be accessed by means of a pull-down menu or from a palette of tools 130 provided in a window on the screen (shown in FIG. 9). Similarly, the programmer can also access a "rotating" tool 133 that allows a selected object to be rotated to achieve a particular orientation. The "rotating" tool can also be accessed by a pull-down menu or from a palette of tools 130 provided in a window on the screen. Alternatively, numerical entry may be made of rotation relative to the support or to the master frame of reference.

These actions by the programmer result in a series of translations and rotations that are reflected in the model object's underlying record. The graphical view presents a view of modelled objects of known size presented in a window also of known size, therefore a scale can be established to determine the effect of a movement in the graphical view on the underlying data base.

For example, if a model object initially has a translation of (0,0,0) and a rotation of (0,0,0) with respect to its support, and the programmer translates the object 10 units in the x direction, 25 units in the y direction and 40 units in the z direction, then the translation will result in coordinates of (10,25,40) for the object. Similarly, if the programmer rotates the object 90 degrees about the x axis of the supporting object's coordinate space, the new rotation of the object with respect to its support will be (90 degrees,0,0). This information can then be updated in the fields of the associated underlying record.

Matrix Transformation Solutions

A complex series of translations and rotations can be resolved by utilizing three-dimensional matrix transformations. An object that initially has translation coordinates of $(x_1,y_1,z_1)$ will have new coordinates of $(x_2,y_2,z_2)$ with respect to its support after a translation, where $$x_2 = x_1 + T_x,$$

$$y_2 = y_1 + T_y, \text{ and}$$

$$z_2 = z_1 + T_z,$$

where $T_x$, $T_y$, and $T_z$ are the components of the translation in the x, y, and z directions. This translation is represented in matrix form as:

$$[x_2 \; y_2 \; z_2 \; 1] = [x_1 \; y_1 \; z_1 \; 1] \begin{bmatrix} 1 & 0 & 0 & 0 \\ 0 & 1 & 0 & 0 \\ 0 & 0 & 1 & 0 \\ T_x & T_y & T_z & 1 \end{bmatrix}$$

Rotation transformations are done in a similar, although more complex manner. It is helpful to utilize three separate transformations for rotation about each of the three coordinate axes. If a graphical object is rotated about the x coordinate axis through an angle $\Theta$ (measured clockwise when looking along the rotation axis (x in this instance) toward the origin), the result is achieved with the following matrix transformation:

$$[x_2 \; y_2 \; z_2 \; 1] = [x_1 \; y_1 \; z_1 \; 1] \begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix}$$

Rotation about the y axis is given by:

$$[x_2 \; y_2 \; z_2 \; 1] = [x_1 \; y_1 \; z_1 \; 1] \begin{bmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{bmatrix}$$

and finally, a rotation of angle $\Theta$ about the z coordinate axis is represented by:

$$[x_2 \; y_2 \; z_2 \; 1] = [x_1 \; y_1 \; z_1 \; 1] \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$

By utilizing a concatenation process, any number of successive transformations can be represented by a single transformation matrix. If a first translation is represented by matrix $T_1$, then a rotation about the x axis represented by matrix $R_x$, and finally another translation represented by matrix $T_2$, the concatenated transformation to represent this sequence that places the new coordinates at (x', y', z') is: $[x' \; y' \; z' \; 1] = [x \; y \; z \; 1] (T_1 * R_x * T_2)$. The order of operations must be maintained when the transformation matrices are cross multiplied together.

Cross multiplying by the inverse matrix $M^I$ of a matrix M performs the symmetrically opposite transformation. The result of this operation is to undo the effect of the transformation with the matrix M.

Illustration

To illustrate the addition of a building block to the model, the selection of the stage's building block element for inclusion in the model and the definition of its necessary characteristic information is discussed with respect to the preferred embodiment. The stage is generally one of the first elements to be defined and placed in the model. The stage is often the support for numerous objects in the model so many other elements are often defined with respect to the stage location. Referring now to FIG. 3, and as discussed in general above, the programmer selects the symbolic representation of the stage icon 66e by manipulating cursor 34. Upon selection of stage icon 66e, the processing means of computer 20 recognizes that the programmer has selected the symbolic representation for the stage or related platforms. The appropriate record and corresponding fields (as discussed above) is established in the data base stored in computer 20. The programmer's selection of the stage element from the legend menu triggers a request, generally by means of a dialogue box (as shown in FIG. 8), to attach a symbolic name such as "stage" to the object. The symbolic name facilitates later programming, and allows the programmer to identify the stage when using it as a support for other objects.

The processing means of computer 20 recognizes that the programmer has selected icon 66e. The selection of this icon invokes a dialogue message such as that shown in FIG. 7, that retrieves the length, width, and height of the element. Thereafter, the programmer is requested to define the stage support, which can also be defined by using a dialogue box. The programmer can be presented with a list of all of the objects that have been previously defined in the model which may serve as a possible support. Generally the appropriate support for the stage will be the "floor" of the venue.

As discussed above, the programmer preferably assigns the position of the stage by using mouse 28 to place the graphical representation of the stage in its corresponding position in the model. If the programmer has specified a support for the stage (generally the floor of the venue), the symbolic object is placed in the center of this graphical space by the modelling system. The programmer then merely has to manipulate the symbolic object into its precise location with "dragger" 132. Alternatively, the programmer may use a dialogue box to numerically define the stage position with respect to fixed locations within the venue boundaries which have been previously defined and given symbolic names. For example, the programmer can define that the "stage" is on the "floor" of the venue centered a particular distance from the "rear wall". Once the symbolic representation of the stage has been positioned in the model's graphical image the algorithm discussed above determines the x, y, and z translation and rotation of the stage with respect to its support (the floor).

The characteristic information defined for this graphical object is stored in the appropriate fields of the record that has been created for the stage object The programmer continues developing the model of the lighting system in this manner by selecting and defining objects to be included in the model. He proceeds to identify every object to be defined in the model, specifying the location and characteristics of each. As each object is added, a record is created that builds upon the previously entered information. The master data base stores all of the records containing parameter information for each of the objects in the lighting system.

PROGRAMMING A LIGHTING SYSTEM USING THE DEVELOPED MODEL

As shown above, a graphical representation of the objects of the lighting system and its venue environment is presented on screen 24 as the objects are defined in the model. The modelling system has recorded the characteristics, dimensions, and location for each object that was added to the model. The completed model and the information that it contains can then be effectively utilized to write "cues" or snapshots of the current state of the elements involved in creating a particular lighting effect. As previously noted, cue data representing the parameters of each element involved in the lighting effect can be written and stored, and later recalled to return the lights to the states they were in when the cues were initially written.

A complete cue defines all of the variable parameters for each light that is necessary to define its lighting attributes and represents what must be transferred to the lights. A partial cue defines only some of the parameters but may be combined on playback with current states to create a final effect. The variable parameters for a state-of-the art automated light, such as a Vari-Lite model VL4 TM include pan, tilt, color, beam size, intensity, edge and gobo.

Selecting Lights to be Defined

Figure 10A:
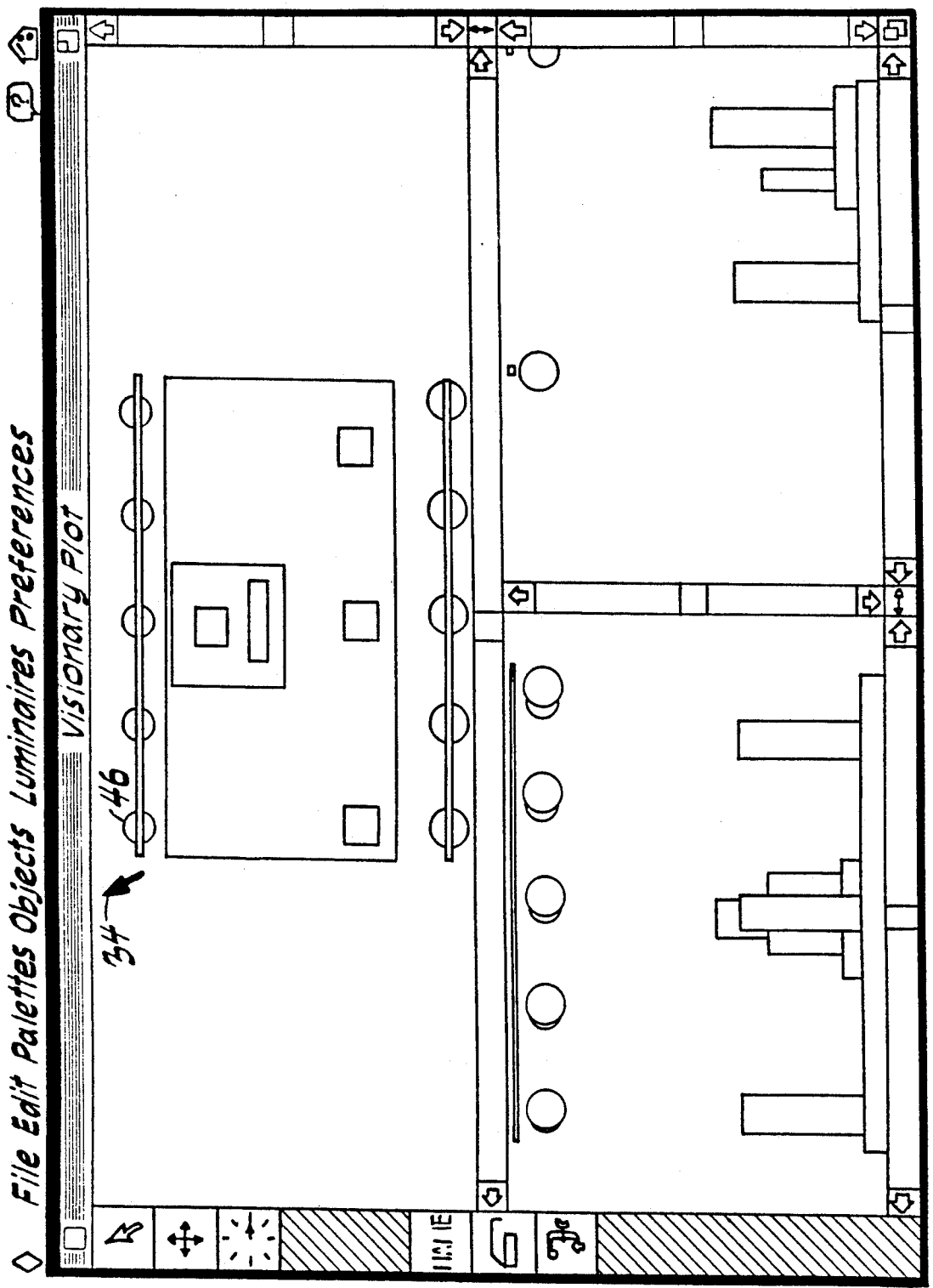
FIGS. 10A through 10C are views of the monitor screens showing various object selections.
Figure 10B:
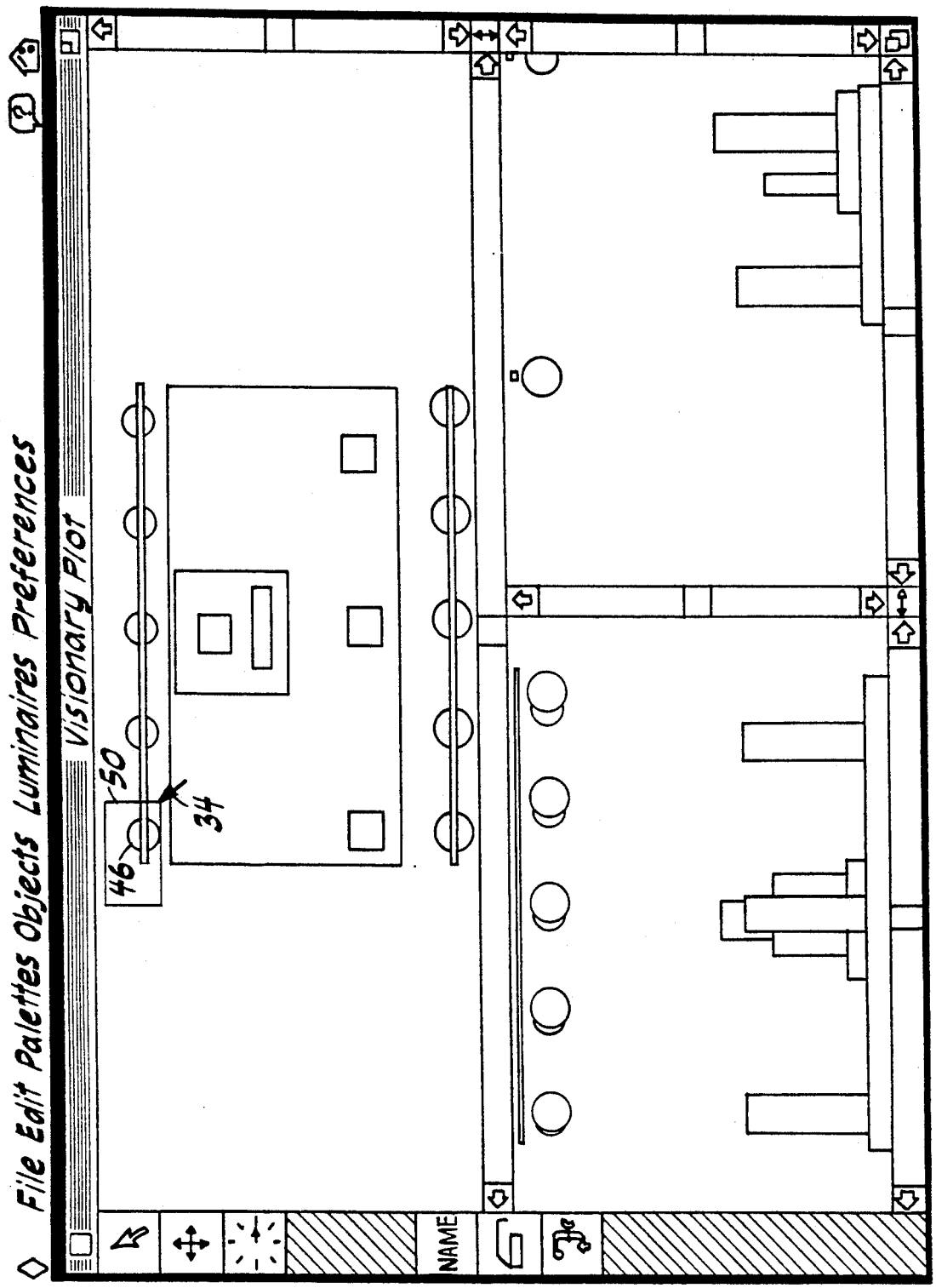
Figure 10C:
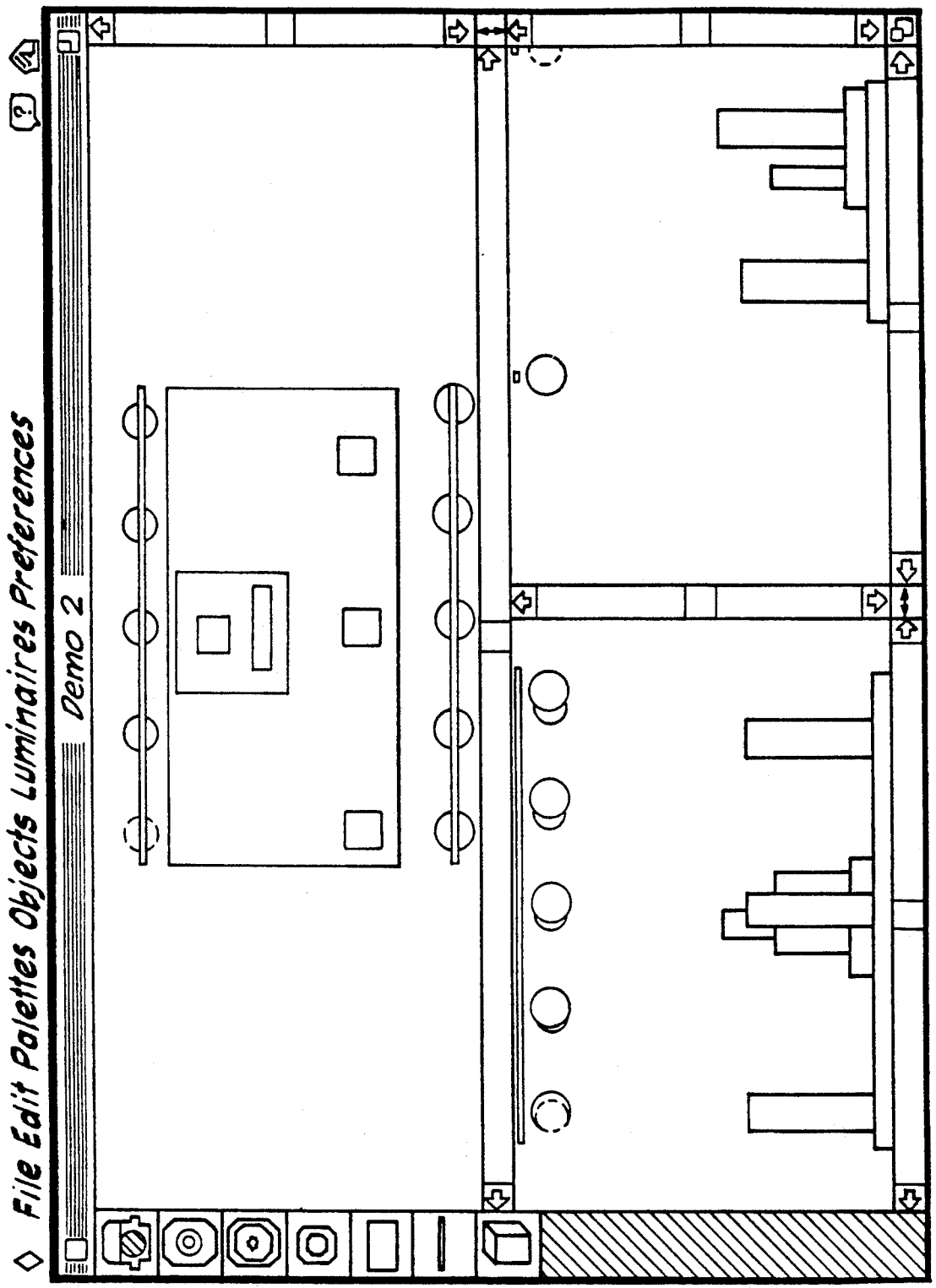

In order to write a cue, the programmer/designer must determine which lights need to be activated, what their associated targets will be, and the overall lighting effect, static and dynamic, that he would like to achieve. Using the representation of the lighting system model displayed on screen 24, the programmer begins by selecting the lights to be activated and defined. The selection of lights may be done graphically, by pointing to the light in the display with the cursor and then pressing a key or button on the input device to indicate the selection to the computer 20. Alternatively, as shown in FIGS. 10 a-c, the programmer can select a light by surrounding it with a marquee. This is done by pointing to the upper left region around the light and clicking button 29 on mouse 28 (FIG. 10a); then without releasing the button, dragging mouse 28 to bring the desired light within the highlighting box 50 (FIG. 10b). Finally, once the programmer is satisfied that he has selected the appropriate light he can release button 29 on mouse 28 (FIG. 10c). As another alternative, the programmer may identify the light to be accessed by entering an alphanumeric symbolic name that identifies the light.

Selection of a Group of Lights

Figure 11A:
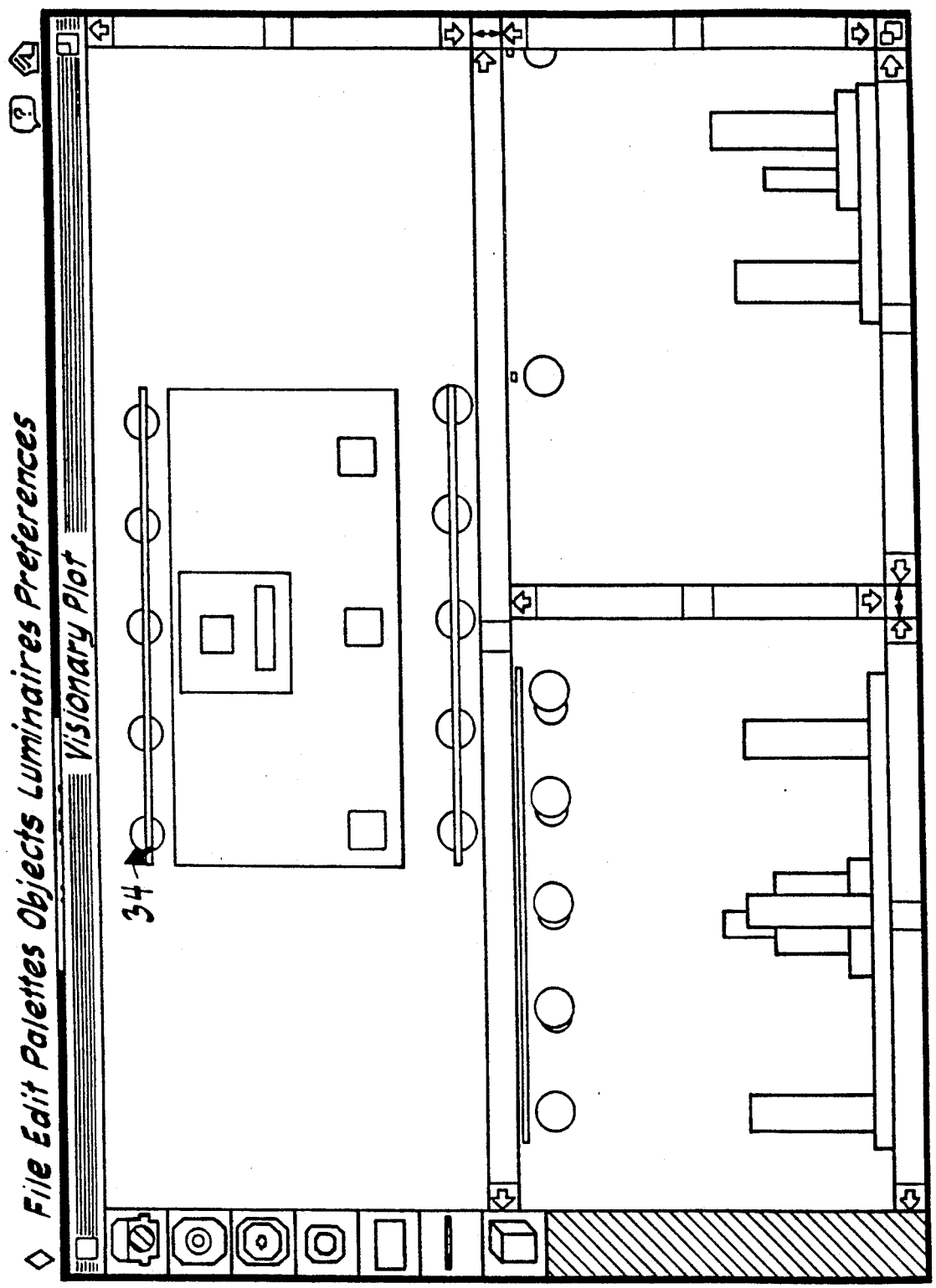
FIGS. 11A through 11C are views of the monitor display illustrating other selection activities.
Figure 11B:
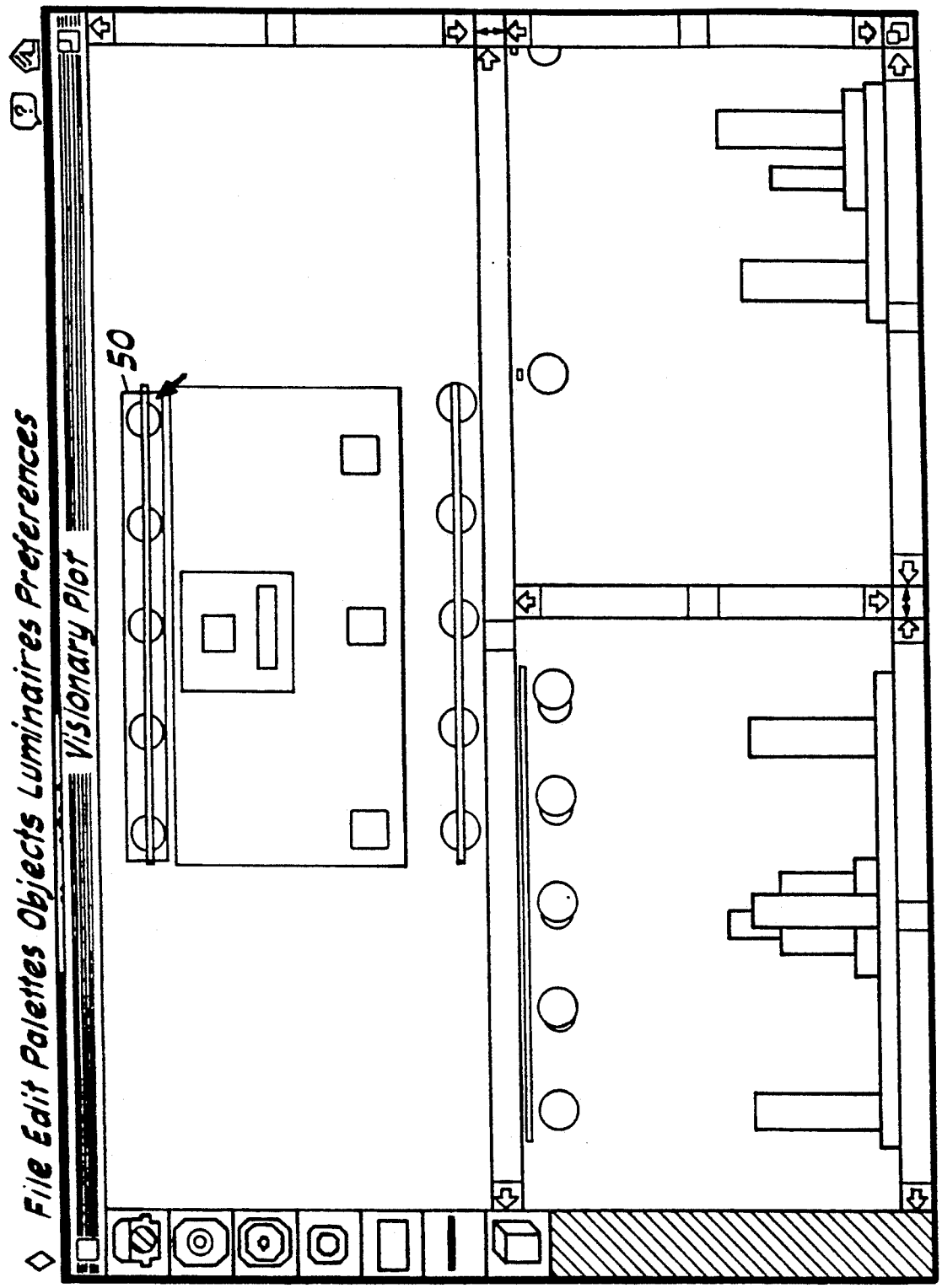
Figure 11C:
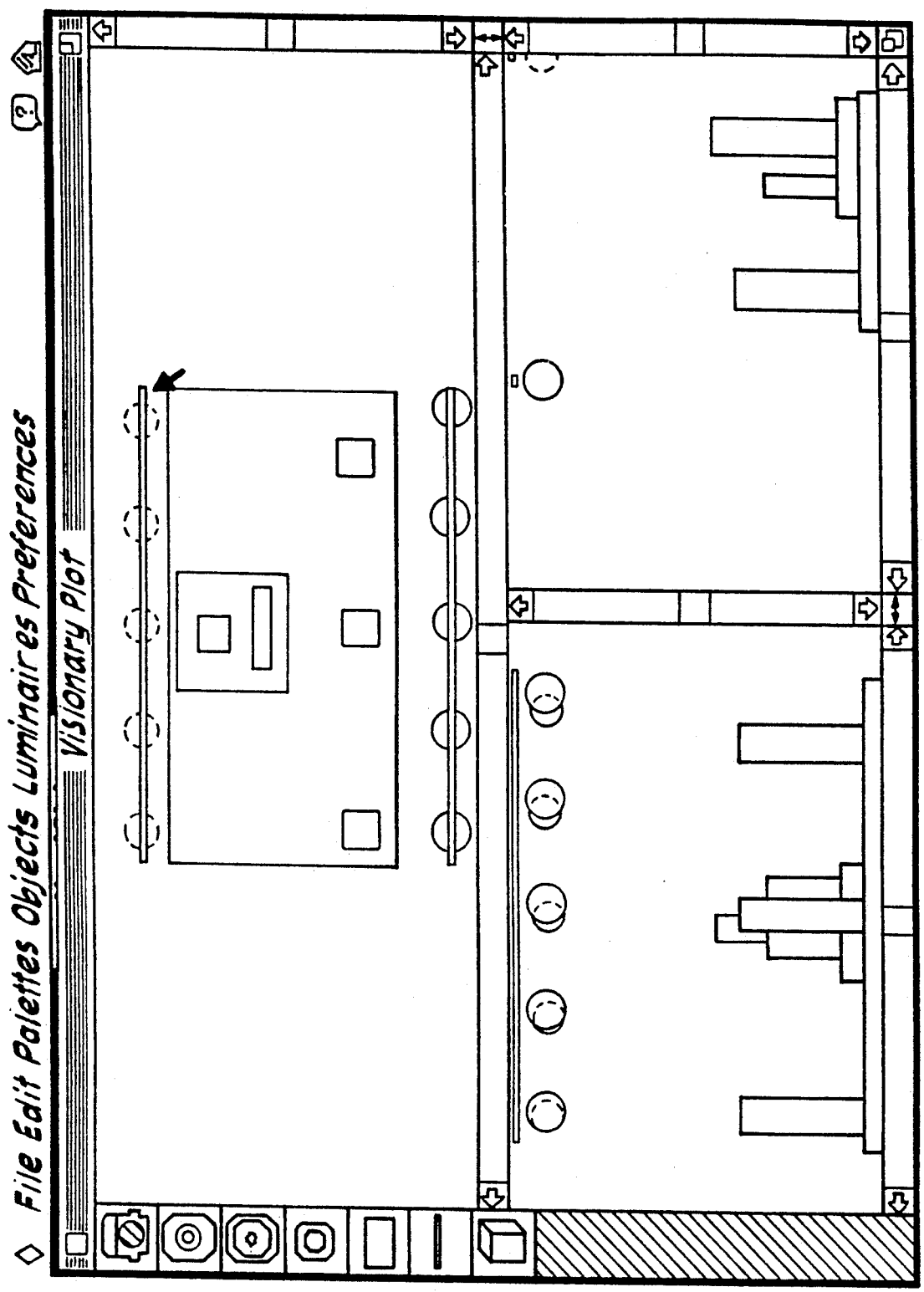

The programmer has the option of selecting an individual light or a group of lights. The selection of a group flights is shown in FIGS. 11 a-c. In this sequence of figures, the programmer clicks on mouse 28 and drags the cursor to include all of the desired lights within the highlighting box 50. The ability to select a predefined group of lights is similar to the "Group Select" option that is a common function of the Vari-Lite control consoles. This feature simplifies the processes performed by the programmer when he wishes to assign the same value for a selected attribute to a group of lights, for example directing a number of lights to the same target. Thereafter, the programmer can assign a symbolic name to the group of lights just selected.

Defining Target Parameters (Pan and Tilt)

The programmer moves the lights to focus on a target by controlling the focus (or pan and tilt) parameter of the lights. The programmer can establish the pan and tilt values of any light in either a direct or indirect manner.

The information recorded in the model has established the position of every element within free space. This information allows the calculation of the pan and tilt values required to point a particular light at a certain target. The pan and tilt values can be calculated by retrieving the location of the particular light and the particular target in free space. This has an advantage over methods of programming employed with the actual lighting system where the pan and tilt values have to be manually adjusted until the light is focused correctly on its target.

The programmer can specify that the pan and tilt values of any light shall be such that the light is focused on a defined target object. Using this "parametric" definition of the pan and tilt values which associates the light or lights with a particular target, the modelling system can compute the appropriate values. To focus the lights in this manner, the programmer indicates the symbolic name of the appropriate target to the computer. The associated target for a light can be retrieved by the programmer by using the dialogue box query of the target's symbolic name. In this embodiment, the programmer indicates to the modelling system the target that the light should be focussed on. Thereafter, the required pan and tilt values are computed. If the resulting tilt is impossible, the programmer is notified by the modelling system.

If a light is focussed by associating a target, the symbolic name of the target and the calculated pan and tilt values can be stored in the light's record. If the target is later moved in the model, the pan and tilt values will be correspondingly changed and updated to maintain focus on the target. Again, if the resulting tilt is impossible, the programmer is notified. When the cue data is transferred to the control console of the lighting system, the pan and tilt values for lights focussed on targets will be transferred as absolute pan and tilt values.

A second method defines the pan and tilt values for the selected lights by entering "absolute" numerical values. This is done by selecting the light or lights to be defined and then responding to a dialogue box query to enter the pan and tilt values.

A third method of defining pan and tilt values for a light is by "preset focus". This method, as implemented in the Vari-Lite console, focusses the lights to their targets by a dereferenced or indirect specification. The programmer selects an arbitrary number of lights, assigns a target to them or enters absolute numerical values and then stores this configuration as a preset focus by attaching an alphanumeric symbolic name to it which serves to identify it.

The preset focus position of all presently activated lights can thus be stored in a file and retrieved at any time by entering the identifying name. This retrieves for each light the pan and tilt values required to focus the light on the desired position.

When a programmer fixes the pan and tilt values for a cue by means of a preset focus, the symbolic name of the preset focus is stored in the cue. The file defining each preset focus is also transferred to the control console. When the data is transferred, the pan and tilt values defined in this manner will be identified by the associated preset focus symbolic name. When a cue using preset focus is executed in a light, the light retrieves the proper pan and tilt value by referring to its preset focus record. Prompts for preset focuses can be presented to the programmer as a graphical duplicate of the preset focus panel on the Vari-Lite console.

A lighting designer uses several different combinations of beam spread and tilt angle to light a performer standing on stage. A 'head shot' uses a narrow beam of light which only illuminates the performer from the neck up to the top of the head. A 'head-and-shoulders shot' is similarly from the shoulders up. A 'waist shot' illuminates the performer from the waist up. A 'full-body shot' illuminates the performer from the feet to head. For any given luminaire illuminating a performer, the tilt value and beam size (beam angle) will be different for each of these 'shots'.

By embedding knowledge of the proportional sizes of the various parts of the human body in the model, the system can calculate the pan/tilt and beam size for each luminaire to achieve a head shot, waist shot, etc. This allows the user of the system to express his requirements by identifying the performer object and the desired type of 'shot', rather than aiming and sizing each luminaire individually.

Often, a lighting designer will set the pan/tilt values of a group of luminaires to achieve a desired arrangement of the light beams in the air, rather than to illuminate a specific target. The designer does this by visualizing a certain volume of space through which the beams are to pass, called the 'target volume'. The resulting arrangement of beams in the air, or 'look', is a function of a few specific characteristics: the positions of the chosen luminaires relative to each other, their positions relative to the target volume, the size of the target volume, and the desired arrangement of the beams in the air. Some examples are a 'fan' (closely spaced luminaires diverging to pass through a large target volume at evenly spaced intervals), a 'crossing fan' (widely spaced lights converging onto a small target volume and then diverging), and a 'wall' (luminaires with parallel beams).

By representing target volumes as an object in the system, the user can move or re-size that volume, after which the system can recalculate pan/tilt values to maintain the desired look. By embedding knowledge of the characteristics of a fan, wall, etc. in the model, the user of the system can specify a look and some of its characteristics and the system will fill in target volume, and specifying a crossing fan of 6 beams from the upstage truss, the system could choose 6 evenly-spaced luminaires on that truss which are currently unused and set their pan/tilt values to achieve the crossing fan.

PREFERRED METHOD OF CALCULATING PAN AND TILT VALUES

Figure 12:
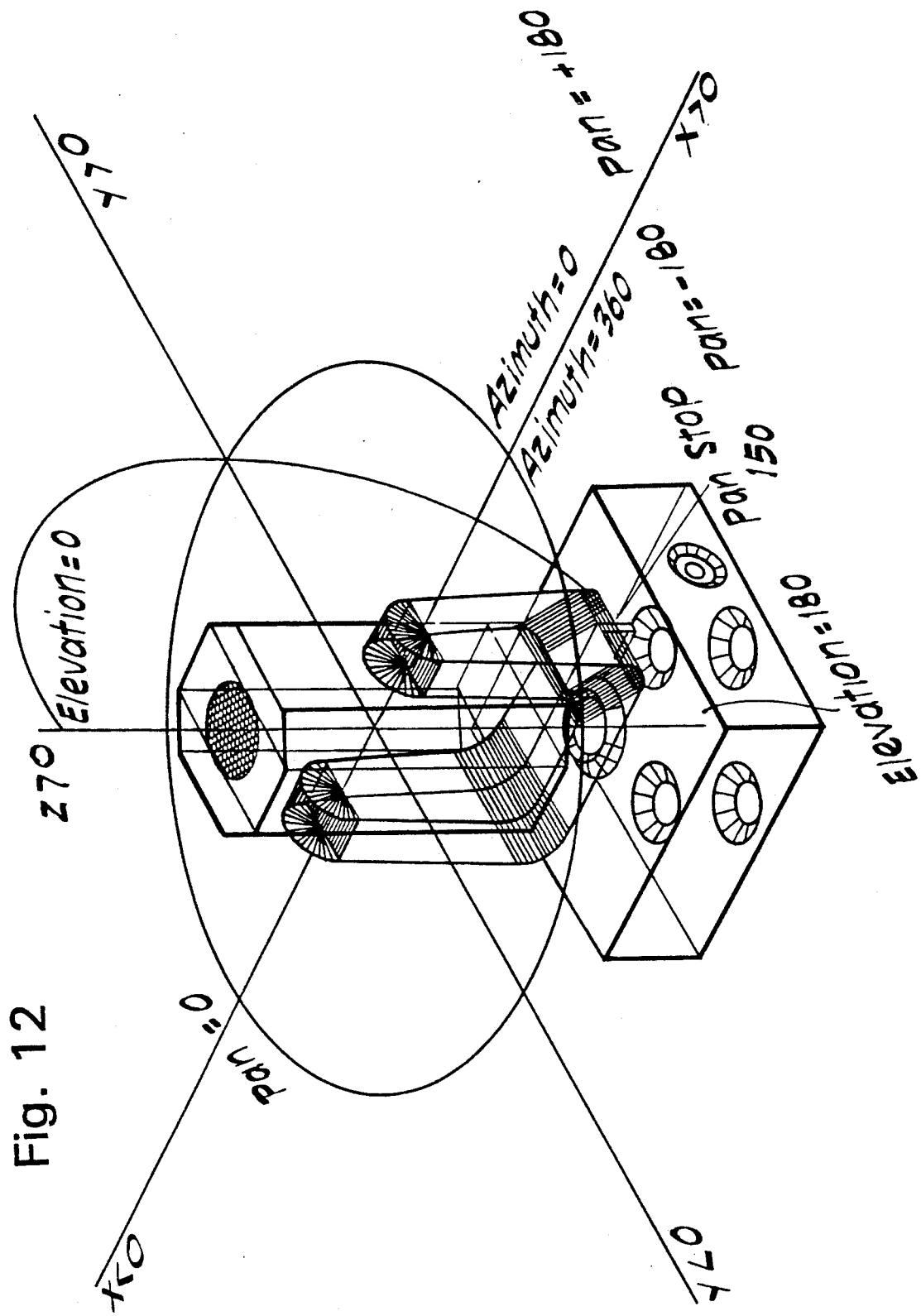
FIGS. 12 and 13 are diagramatic views of a luminaire illustrating the coordinate axes and angle specifying conventions.
Figure 13:
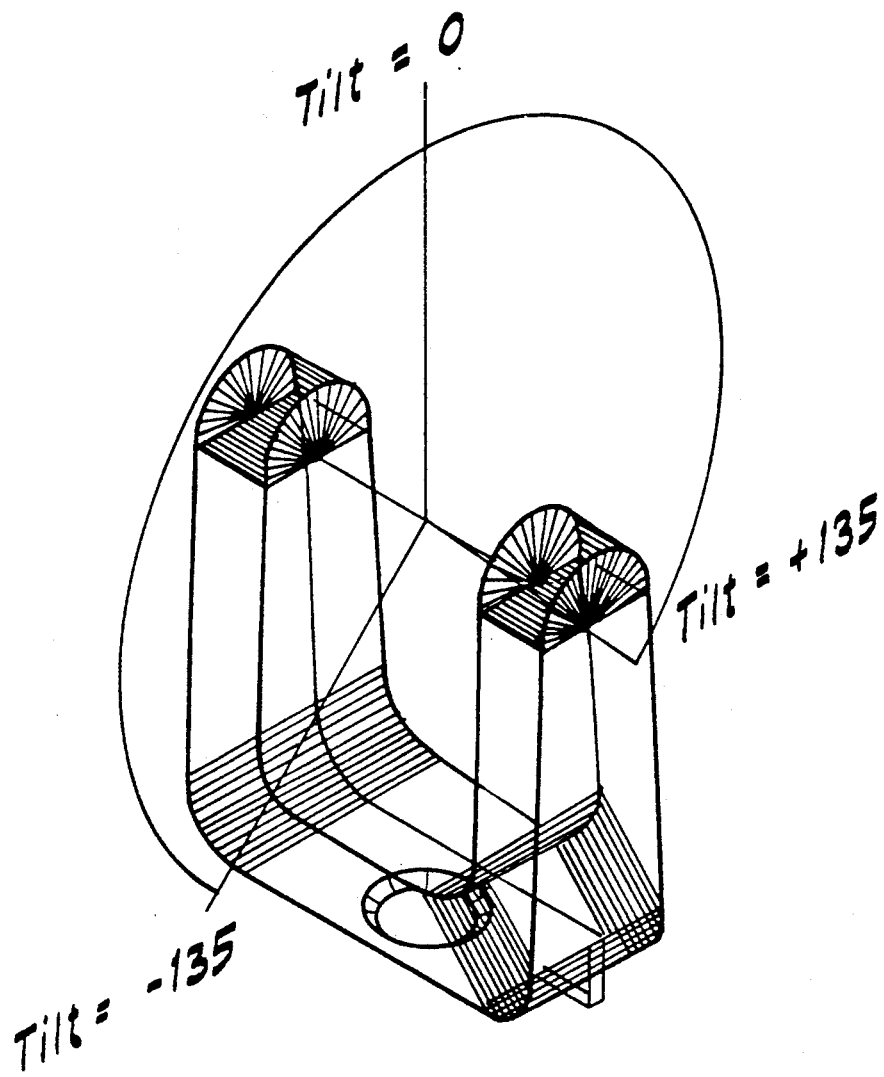

The preferred method for calculating the pan and tilt values necessary to focus a light on a particular target is discussed with respect to FIGS. 12 to 18. FIG. 12 shows the coordinate map for a typical automated light. This figure shows the x, y, and z axes in the coordinate space of the lamp. The relationship between pan and azimuth is also shown. Pan stop 150 serves to limit the rotation of the lamp. As shown in FIG. 13, the tilt value of a typical lamp is limited to the range of $+135°$ to $-135°$.

In order to determine the pan and tilt values needed to focus the light at the target, the position of the target within the lamp's coordinate space must be determined. This can be performed by determining the inverse transform matrix of the lamp within the master frame of reference. Thereafter, the x, y, and z coordinates of the target must be determined in the master frame of reference by tracing back the "tree" of supports. If the x, y, and z coordinates of the target in the master frame of reference are cross-multiplied by the inverse transform of the lamp's matrix, the end result will be the position of the target in the lamp's coordinate system. The position of the target relative to the lamp's coordinates is used to obtain the azimuth and elevation of the target with respect to the lamp.

The pan and tilt calculation for the light depends on the azimuth and elevation of the target in the coordinate system of the lamp. The azimuth angle of the target is the angular distance of the target from the reference axis (x), $x>0$, in the "horizontal" or x,y plane of the lamp. As shown in FIG. 12, the azimuth angle is measured from $0°$ at the reference axis counterclockwise through $360°$. Similarly, the elevation angle of the target is the angular distance of the target from the reference axis (z), $z>0$. As shown in FIG. 13, the elevation angle is measured from $0°$ at the reference axis clockwise through $135°$ and counterclockwise through $-135°$. Given the x, y, and z coordinates of the target in the lamp's coordinate space, the azimuth and elevation of the target can be determined using trigonometric identities.

Figure 14:
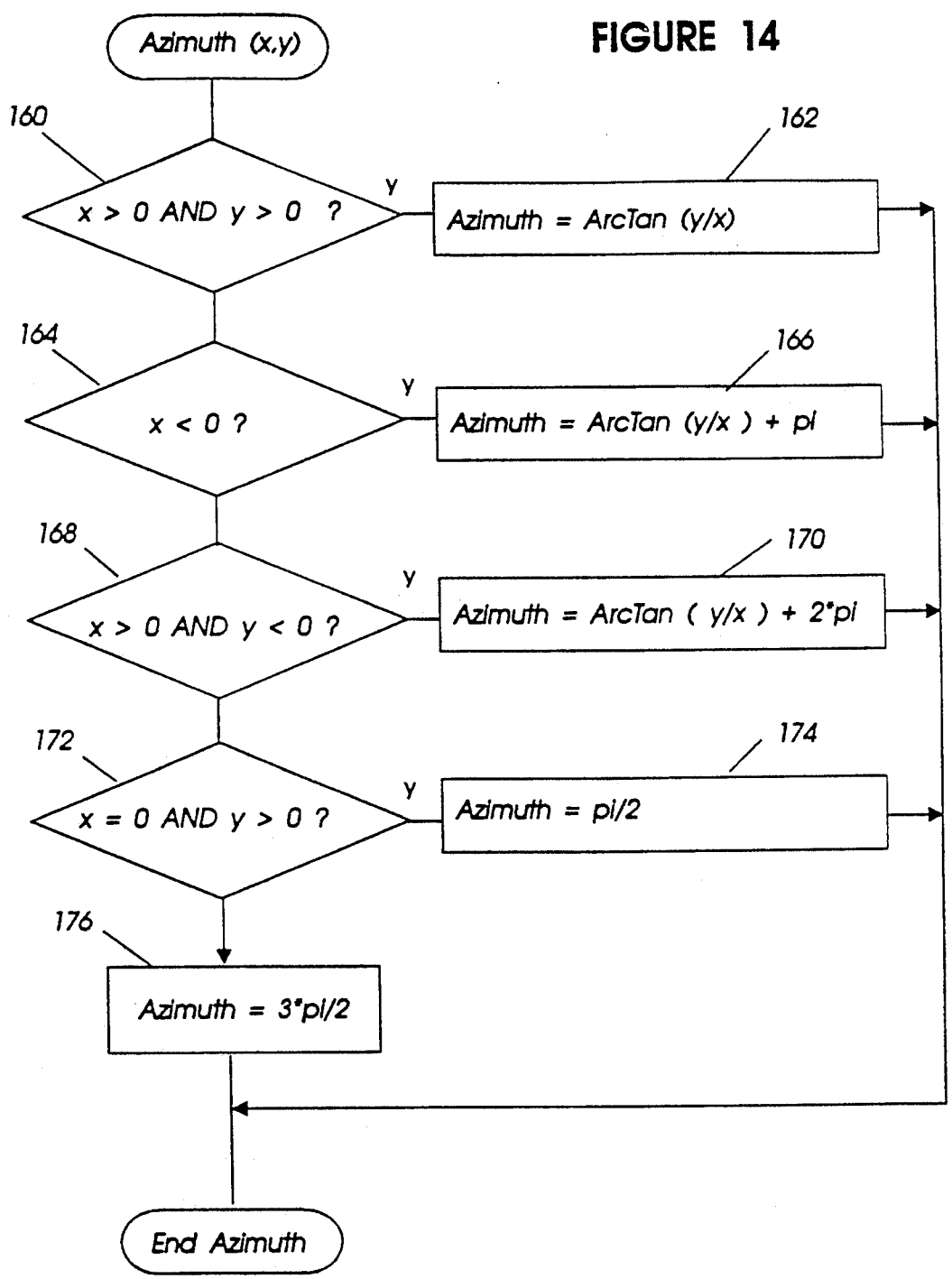

Referring to the flow chart in FIG. 14, the azimuth of the target is obtained by evaluating the x and y coordinates of the target in the lamp's coordinate space. The values of x and y are tested against the conditions defined in box 160, 164, 168, 172 in the flow chart. The appropriate calculation for each condition is defined in the associated boxes 162, 166, 170 and 174. The necessary operation is performed to obtain the azimuth (in radians).

Figure 15:
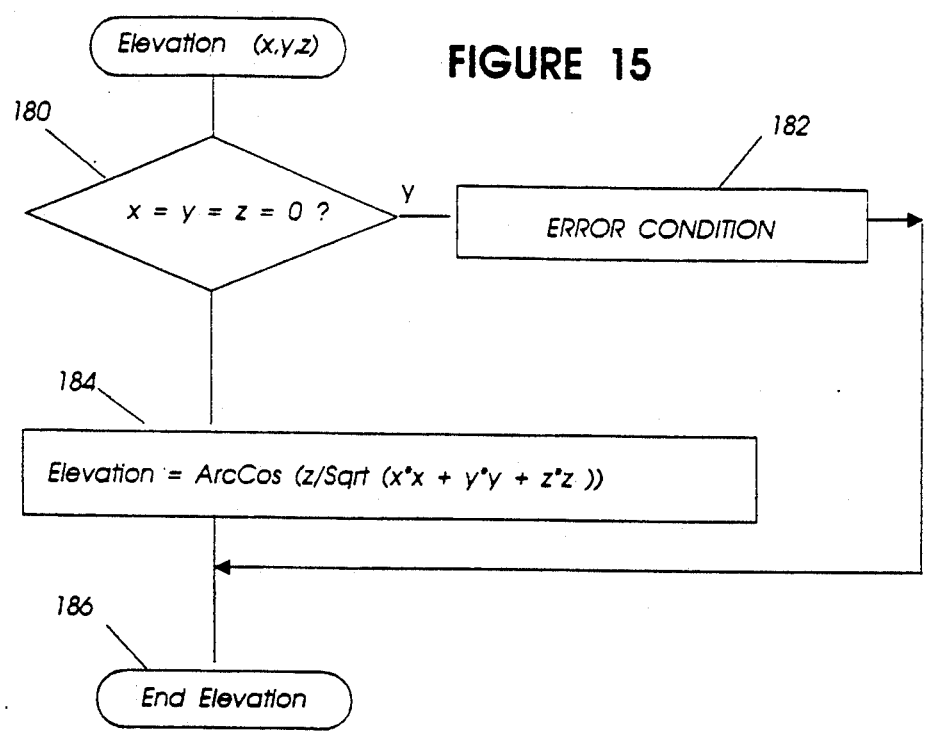

Referring now to FIG. 15, the elevation of the target is similarly obtained by evaluating the x, y, and z coordinates of the target in the lamp's coordinate space. The elevation of the target is obtained as a function of the target coordinates. As shown in the flow chart, the formula for the elevation calculation is:

$$\text{Elevation} = \text{Arccos}(z/(x^2+y^2+z^2)^{\frac{1}{2}})$$

The elevation is calculated for the coordinates as long as error condition 182, e.g., a target point within the volume of the light itself, is not satisfied or x, or y or z is nonzero.

There are two sets of azimuth and elevation values that will correctly focus the light on the same target. If one set of pan and tilt values for a target is A° and E°, respectively, then the other pair of pan and tilt values to focus the light on the same target is (A°±180°) and (−E°), respectively.

Figure 16:
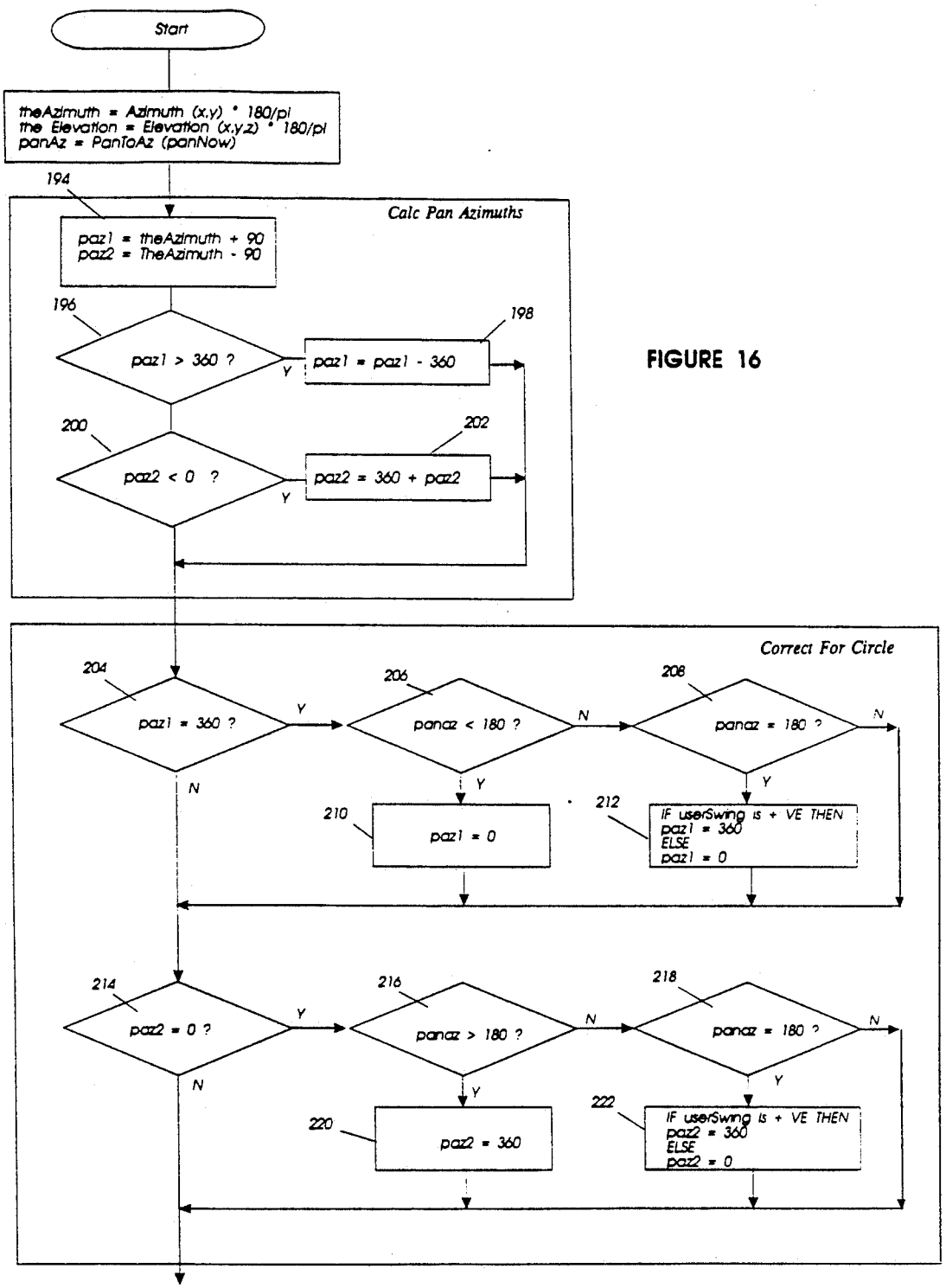

The flow chart in FIG. 16 shows a method for determining which pair of azimuth and elevation values will point the light to the target with minimum yoke movement The azimuth and elevation (calculated in radians) are converted into degrees in step 192. Additionally, it is necessary to determine the corresponding pan-azimuth value (panaz) associated with the present pan setting (pannow) 192. "Panaz" is used in comparing the two pan-azimuths which point to the target and in determining which is preferred.

In step 194 the two possible pan-azimuths that point at the target are obtained by adding 90° to the azimuth (paz1) and subtracting 90° from the azimuth (paz2). The 90° is added or subtracted from the calculated azimuth value so that the plane of tilt rotation will pass through the target. Since a pan-azimuth of 0° is defined in FIG. 12 to be pointing along the x axis, a pan-azimuth of 0° puts the tilt plane in the plane of the y-z axes. In this position, the lamp could point to an azimuth of 90° or 270°. Thus, in order to produce a pan-azimuth from an azimuth, 90° must be added to or subtracted from the desired azimuth.

Since the range of valid pan-azimuths is limited to 0° through 360°, steps 196-202 guarantee that "paz1" and "paz2" are maintained in this range (modulo 360°). If paz1 is greater than 360° then 360° will be subtracted from the value (step 198). For example, a pan-azimuth of 400° is beyond the range of the lamp so the value is reduced by 360° to an equivalent pan-azimuth of 40°. Similarly, if paz2 is less than 0° then 360° will be added to it, to keep the pan-azimuth in range (step 202).

As a result of pan stop 150, pan-azimuths of 0° and 360° represent different positions of the yoke, each being on opposite sides of pan stop 150. In steps 204 through 220, it is determined whether the two possible pan-azimuths (paz1 and paz2) are set to either 0° or 360°. If paz1 is equal to 360° and panaz (the present pan-azimuth setting) is less than 180° (step 216) then paz1 should be set to 0° (step 210) in order to minimize the rotation of the lamp. However, if panaz is equal to 180° (step 208) then each direction of rotation is the same, and a "tie-breaker" should determine whether 0° or 360° is used (step 212). This tie-breaker can be under user control. Steps 214 through 220 show the steps for analyzing paz2. After these steps have been performed, there are two possible solutions for pan-azimuth that are 180° apart. These two values are the output of the flow chart shown in FIG. 16.

Figure 17:
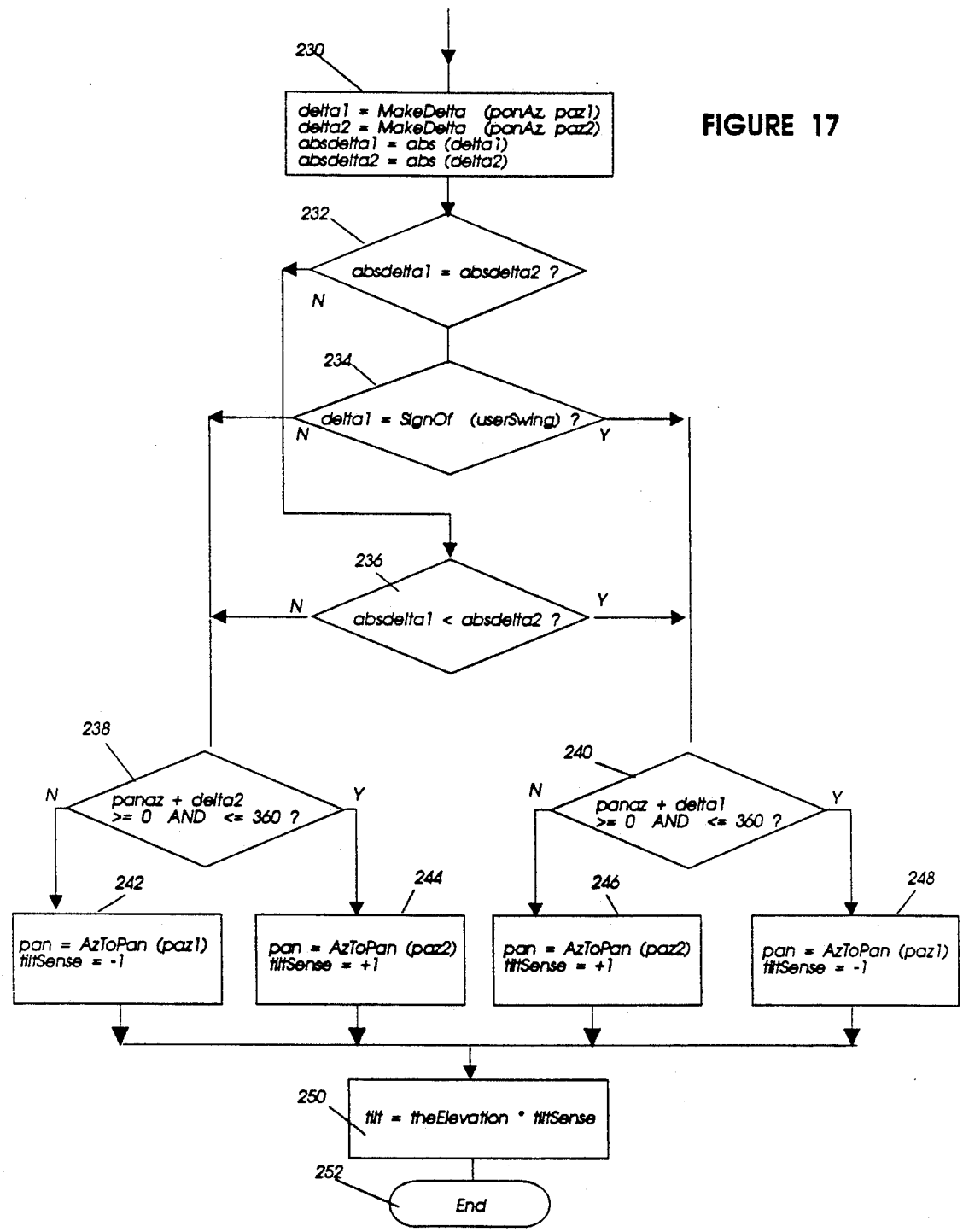

The flow chart of FIG. 17 (see also FIGS. 18a, b and c) determines which of the two solutions should be utilized. Step 230 determines the delta angular distance that must be traveled by the lamp in moving from the present setting to the new setting for each of the two pan-azimuth values (resulting in delta1 and delta2). In step 232, it is determined whether both paths travel the same angular distance If they do, then the tie-breaker determines which pan-azimuth will be used (step 234).

However, if the paths are not the same, then a determination is made as to which value represents the shortest angular distance (which is the smaller of delta1 and delta2). If the angular distance offered by the first value (paz1) is smaller than the angular distance offered by the second (paz2), then the algorithm proceeds to the branch of the flow chart with steps 240, 246 and 248. Step 240 determines whether you can get to the new pan-azimuth value from the previous pan-azimuth value without traveling through pan stop 150. If so, then the first pan-azimuth value (paz1) is selected and converted to a pan value. The corresponding tilt value is chosen based on the "tilt sense" value, where:

tilt = elevation * tilt sense. (step 250).

If step 240 determines that the light cannot travel from the previous pan-azimuth value to the new pan-azimuth value without going through the pan stop 150, then the longer distance (paz2) should be chosen. Steps 238, 242 and 244 proceed from step 236 when the angular distance to be traveled is shorter for the paz2 value. These steps are evaluated in the same manner as steps 240, 246 and 248.

Since tilt values are limited to the range of +135° and −135°, if an impossible tilt value results then there will be no solution and an error condition will arise.

Example

The pan and tilt computation is discussed below with respect to the position of a target in a lamp's coordinate system. In order to illustrate, a target having coordinates of (20,20,45) in the lamp's coordinate system is discussed. Proceeding initially to the steps shown in FIG. 14, the x and y coordinates of the target are both positive (condition of Step 160), therefore the calculation results in an Azimuth equal to the inverse tangent (arctan) of (20/20) or the arctan of 1. This results in an azimuth value of $\pi/4$ radians (or 45 degrees).

Thereafter, the elevation is calculated according to the method shown in FIG. 15. Since the error condition of Step 180 is not satisfied, the following elevation computation is performed in Step 184:

$$\text{Elevation} = \text{Arccos}(45/(20^2+20^2+45^2)^{\frac{1}{2}}).$$

An elevation of approximately $\pi/5.6$ radians (or +32.2 degrees) results.

As discussed above, the algorithm in FIG. 16 determines which of the pair of possible pan and tilt values will point the light to the target with the least amount of movement. Step 192 of FIG. 16 converts the previously calculated azimuth and elevation radian values into degrees. We have already calculated the azimuth and elevation to be 45 and 32.2 degrees, respectively. Step 192 also requires the pan-azimuth value corresponding to the present pan setting to be determined, according to the method shown in FIG. 18b. Assuming that the light has an initial pan setting of 270 degrees, the corresponding pan-azimuth value will be (270-180) degrees or 90 degrees. As seen in FIG. 16, this variable is "panaz".

Step 194 determines the two possible pan-azimuth values that will point to the same target based on the azimuth value. The resulting value of "paz1" is 135 degrees (45+90), and "paz2" is −45 degrees (45−90). Since paz1 is not greater than 360 degrees (Step 196), the algorithm proceeds to Step 200. Since paz2 is less than 0 degrees (Step 200), 360 degrees is added to the value of paz2, resulting in a value of 315 degrees, in order to maintain the value between 0 and 360 degrees.

Here, paz1 is not equal to 360 degrees (Step 204) and paz2 is not equal to 0 degrees (Step 214), therefore paz1 and paz2 represent the two possible values of pan-azimuth (and are 180 degrees apart). These two values are the output of the FIG. 16 flow chart.

The method of FIG. 17 determines which of the two solutions just determined should be utilized. Step 230 determines the angular distance that must be traveled by the lamp in traveling from the present setting (panaz) to each of the two settings just calculated (paz1 and paz2). These delta values are calculated according to the method shown in FIG. 18a. "Delta1" is the angular difference in traveling from panaz equal to 90 degrees to a new setting of 135 degrees. FIG. 18a results in a delta1 of 45 degrees. Similarly, "delta2" is the angular distance required to travel from a panaz of 90 degrees to a new setting of 315 degrees. FIG. 18a results in a delta2 of 225 degrees. Since, in this case, both of the calculated deltas are positive, taking the absolute value of these values in Step 230 has no effect. Since absdelta1 does not equal absdelta2, the execution proceeds to Step 236. Since absdelta1 is less than absdelta2, the flow of execution proceeds to Step 240. Finally, since the result of Step 240 is a "yes", the program execution proceeds to Step 248, wherein a pan value of 45 degrees is obtained (according to the method shown in FIG. 18c). Since "tiltsense" is set equal to −1 during Step 248, the tilt value calculated in Step 250 is −32.2 degrees. The required pan and tilt values to point the light at the coordinates (20,20,45) are now known.

MODEL CUES

The programmer can establish "model cues" to allow for the recreation of a given arrangement of objects in the model. When the programmer has organized the objects of the model (e.g., the position of setpieces, trusses, luminaires and targets) he can store the arrangement as a model cue. This model cue can then be retrieved from memory later to establish the model in the stored arrangement. Upon recalling a model cue, each object in the model will return to the position it occupied when the model cue was stored. The programmer can assign a unique alphanumeric name to each model cue in order to identify it. As a model cue is created, the current arrangement of the all of the objects in the model are stored in it including dimension, translation and rotation with respect to the object support, the symbolic name of supporting object and an indication of whether the object is shown or hidden in the graphical display of the model. The programmer can modify a previously stored model cue by selecting model objects and storing them in the existing model cue.

The programmer can use these model cues to facilitate the programming process. By entering the alphanumeric identifier of a model cue, he can place the objects in a desired configuration. If the model has been arranged using a previously defined model cue, then when the programmer saves a preset focus or cue, the alphanumeric identifier associated with the model cue will be stored as part of the preset focus or cue.

Thus, the programmer can write cues and preset focuses that are based on the previously stored model cues. If the programmer later changes a model cue that was developed during the programming process, the change will automatically be reflected in all of the cues and preset focuses that were based on the original model cue. The required pan and tilt values for those preset focuses and cues will be recalculated and the programmer notified if any impossible tilt values result.

Defining Beam Characteristics

Similarly, the programmer may define the remaining beam characteristics of a complex automated lighting system (such as color, beam size, intensity, edge and gobo) in a number of ways. One alternative is to define the parameters in an "absolute" manner. As an illustration, if the programmer wishes to define the intensity of the lights in an "absolute" manner, he can specify that all of the selected lights should have an absolute intensity value, for example an intensity of 65%. Parameter data that has been defined in an "absolute" manner will not be automatically updated as alterations are made in the model.

Alternatively, the programmer can define these parameters in a "parametric" manner, which allows the programmer to assign parameter values with respect to a particular target. To illustrate, if the programmer defines the intensity in a "parametric" manner, he specifies that all of the lights which are focused on a particular target or are in a particular color or are mounted on a particular truss, shall have a particular intensity, for example an intensity of 65%. The target or color or truss may be chosen by utilizing a dialogue box to enter the symbolic name that identifies it or by selecting it with the input device as discussed above.

In another variation, the programmer specifies that all of the lights focused on a particular target should be adjusted to produce a desired intensity at the target. The system calculates the required intensity for each light so that for the combined effect of all the lights focused on the target achieves the desired lighting level.

Defining Color

When the programmer is specifying the color for a particular light or group of lights, he may select the color in a number of ways. Once the programmer has selected a light to be defined as part of the model, the particular type of light that has been selected is known. Correspondingly, the color palette appropriate for that type of lighting instrument can be presented to the programmer in a dialogue box. The programmer can use the palette to select the color. In this manner, the programmer can review the available colors and select the desired one. The color palette can be presented in a familiar format such as by the chromaticity triangle. Alternatively, the programmer may wish to enter an alphanumeric name that has been associated with a color he desires. As another possibility, the programmer may define color in an absolute manner by directly controlling the positions of the color filtration elements in the lighting unit. This is obtained by defining the position of the color wheels (for example in a VL2B TM), or by defining the angles for each of the three color filters (magenta, amber, blue) of a lighting unit such as in a VL4 TM.

In a preferred embodiment of the invention, the programmer is able to assign the color of a lighting instrument by establishing "preset colors", similar to the control offered by the Vari-Lite console. Typically the color produced by a lighting instrument can be defined with "standard" colors (assigned by the manufacturer) as well as "custom" and "open" colors (assigned by the programmer). When the color is defined by using "custom", the preset color identifier is stored in the cue. The programmer defines "custom" colors indirectly, by means of dereferenced colors. The color that will be recalled when the cue is initiated is the color that is programmed into the "custom" palette at the time when the preset color is stored. When the color of lighting instruments is defined by means of "open" colors, they will be assigned an absolute color.

The color of a selected light can be specified by a prompt which duplicates the Preset Color controls of a Vari-Lite control console. In that console, the action of pressing a preset color button on a console sets the currently selected lights to the color assigned to that preset color.

Gobo Selection

Similarly, if the lighting instrument being defined achieves beam modification by means of a gobo, the data base can maintain tables of the available gobo selections for each lighting instrument being used and the gobo selected. When selecting the gobo to be used to project a desired beam configuration, the programmer can be presented with a graphical representation containing all of the possibilities. The programmer then merely selects the gobo that he would like to use to achieve the desired effect from the alternatives presented. Alternatively, the programmer can specify his gobo selection by indicating the stop position of the gobo wheel.

When defining other beam characteristics, such as beam size, intensity, and edge the programmer may specify these values by entering the desired values in a dialogue box.

STORING CUE DATA

Once the programmer has obtained the desired lighting effect for a particular cue by manipulating the parameter values, he can store the parameter information as a cue for later retrieval. Each cue is assigned an alphanumeric name for identification, which is generally a number system that follows the sequence of the performance. The cue data may be stored in the memory of computer 20 and/or an external storage media such as a diskette. Cue data may be formatted for transfer to and use by the actual lighting system (discussed further below). When the cue is stored in the memory of the actual lighting system, it may be recalled by entering its associated number. Once a cue is initiated by the programmer in the actual lighting system, the lights will adopt the state that their corresponding model objects were in during the simulation when the model cue was stored.

Figure 19:
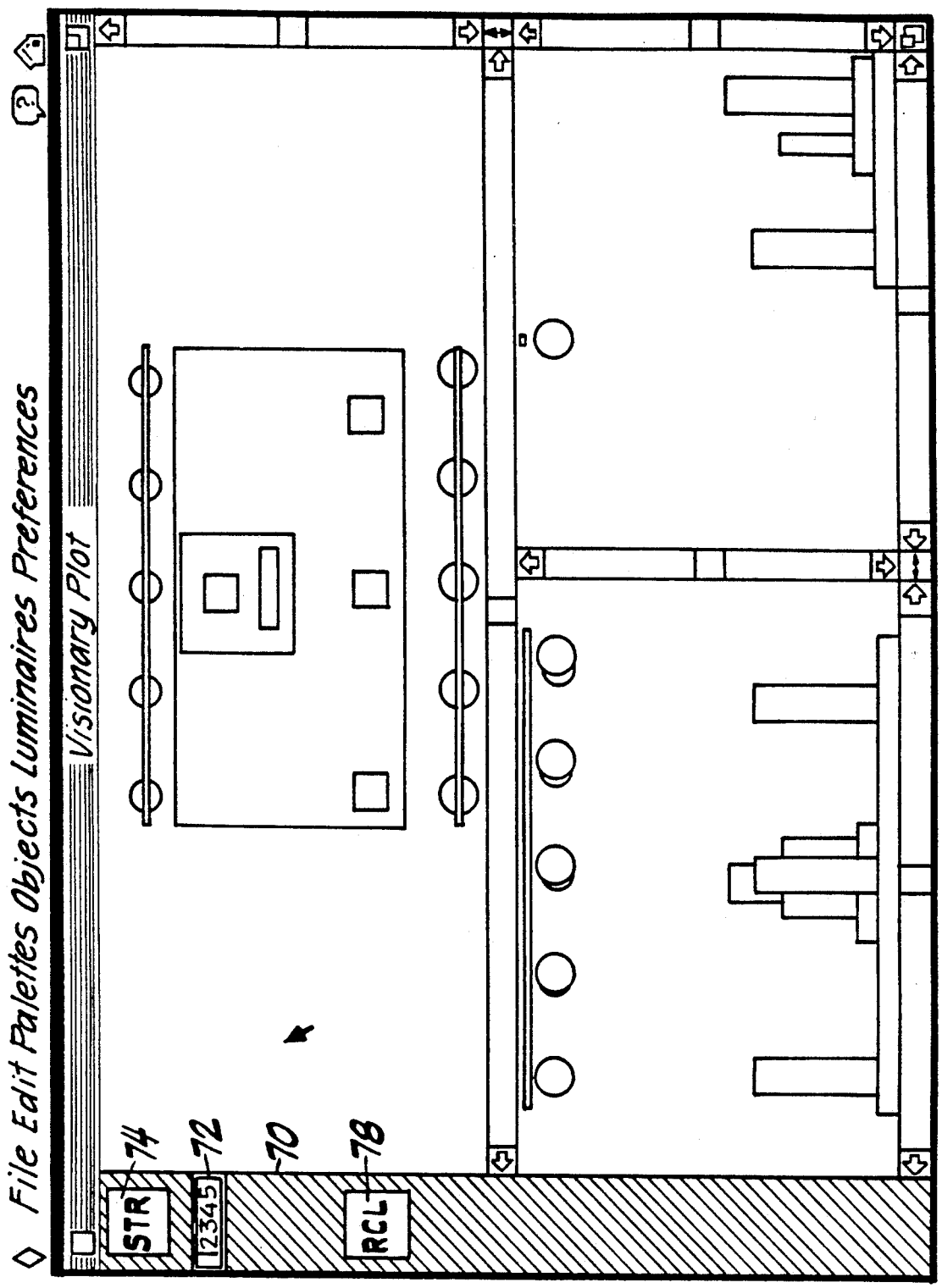
FIG. 19 shows the monitor display screen with the cue store and recall palette.

Cues may be written and stored through an interactive process. A preferred embodiment for the process of writing and storing cues is illustrated in FIG. 19. The cue writing menu 70 shown in FIG. 19 can be presented in a window or accessed by means of a pull-down menu. After the programmer has obtained the lighting effect that he desires by manipulating the lighting attributes according to methods discussed above, he can store the lighting effect as a particular cue number by entering the number in the cue number icon 72 and clicking on the "store" or "str" icon 74 shown in FIG. 19. Similarly, if the programmer wishes to recall a lighting effect that has been previously stored as a cue, he may do this by entering the desired cue number in the cue number window 72 and clicking on the "recall" or "rcl" icon 78. The screen will automatically be updated to reflect the lighting effect of the selected cue.

GRAPHICAL REPRESENTATION OF LIGHTING EFFECTS

Figure 20:
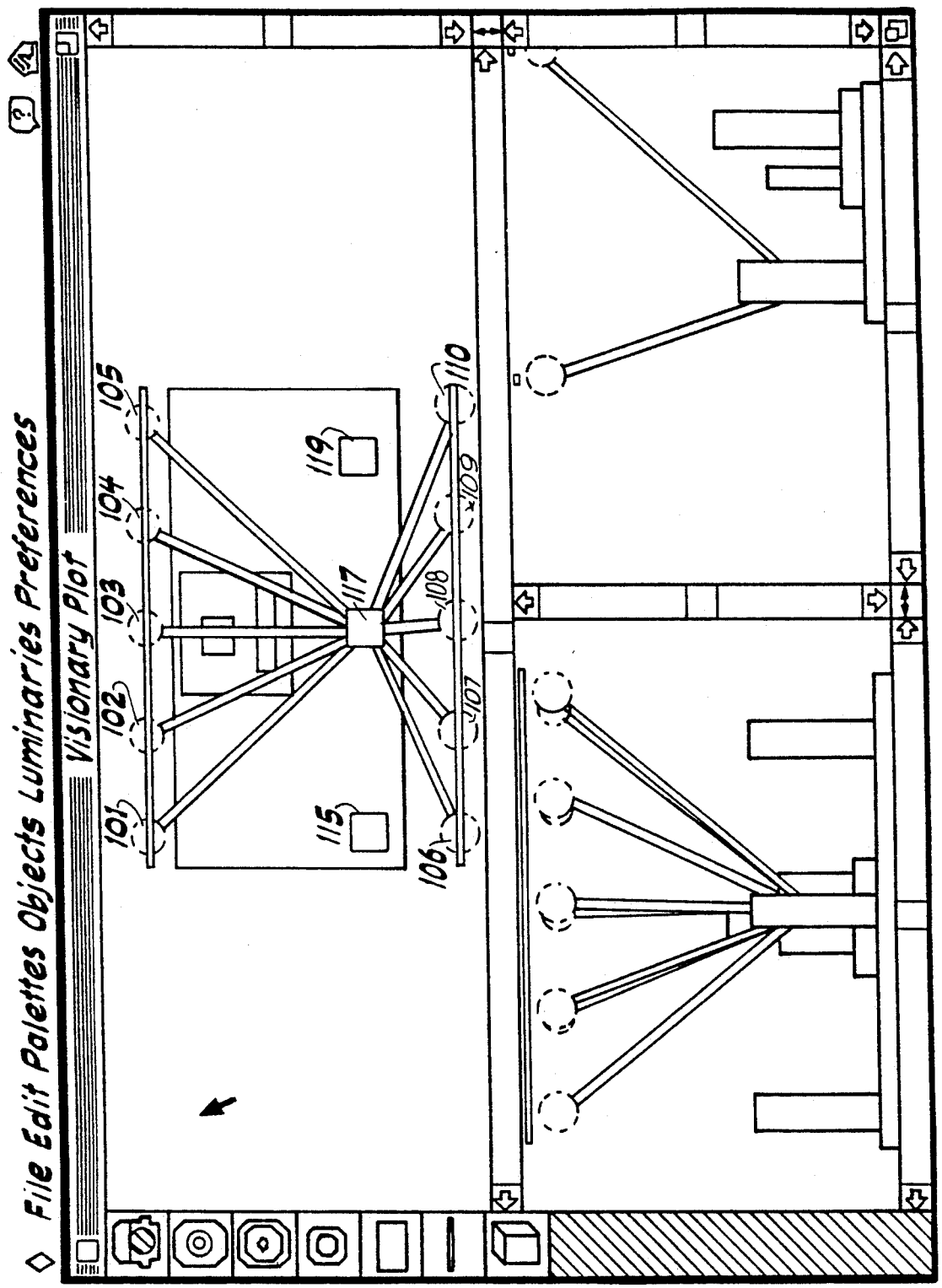
FIG. 20 shows the monitor display with an actual lighting scene simulated thereon.

During the modelling process graphics display 24 presents the programmer with a view of the information stored in the underlying master data base. Similarly, as the programmer programs the lights, display 24 is utilized to show the programmer the effect that each parameter variation has upon the lighting system. As shown in FIG. 20, graphics display 24 provides a representation of the lighting effect as the programmer varies and defines the parameters for each light. The simulation displays the effect of pan and tilt by showing a beam of light that originates at each light source and terminates at the associated target. In this case, each of the lighting instruments 101–110 are focussed upon the singer 117.

A color graphics display allows the beam of light to be displayed in the color that has been selected by the programmer. The programmer can also get an accurate view of the effects of beam size, as the beam of light will spread according to the programmed value. The underlying system aided by this graphics feature allows an entire light show to be programmed without requiring the presence of the control console or the lights. The programmer is able to see the lighting effects as a function of the parameter data, and as a result programming methods are not limited by the ability of the programmer to imagine the lighting effects. The programmer observes where the lights are focussed, and can visualize how the lighting attributes of each individual light combine to produce the overall lighting effect.

While programming a particular cue, the programmer can observe the effects of any parameter changes on the overall lighting effect. If the programmer were to recall a previously recorded cue from memory, according to methods discussed above, the model would be graphically represented on the display 24 with the lighting effect as a function of the stored cue data. If the programmer modifies a stored parameter, such as color, the representation would show the programmer the results of such changes.

UPDATING THE DEVELOPED MODEL

Generally, it would be very difficult to develop a single model that accurately reflects the features of every venue in which the performance tour will operate. Each venue has its own unique attributes and dimensions which may need to be reflected in the model in order to obtain accurate cue data. Correspondingly, if the programmer has written his cue data such that certain parameters depend on an accurate representation of the venue boundaries, stage size, etc. then the programmer must ensure that this information is correctly defined in the model. The programmer can update the stored information either by selecting the graphical representation of the object using the input device, as discussed above, or by entering the alphanumeric name that is associated with it. Upon doing either of these, the programmer is presented with the information that has been previously defined for the selected object. The programmer may then update any of the information in the model that does not conform to the actual environment.

Similarly, if the physical placement or characteristics of any of the elements of the lighting assembly and stag environment within the venue do not coincide with the way they were defined in the model, the programmer must update this information. If the position or other characteristic data of an element needs to be revised, the programmer selects the item to be updated from the model and then updates the information previously entered in the model. These tasks may be done graphically, by means of a dialogue entry, or using the spreadsheet mode as discussed above. As the programmer modifies the model, e.g., as he moves an object to a new location on the display screen, the new information is reflected by a change of values in the underlying corresponding data base.

Any needed update to the model can be easily executed in order to incorporate new information into the model to accurately reflect the actual lighting system and stag environment.

UPDATE OF PREVIOUSLY WRITTEN CUE INFORMATION

Furthermore, the parameter data stored as cues may need to be updated if the sequence of events in the performance has been changed, or the location of targets in certain cues is modified. As discussed above, the programmer can update cue data by retrieving the cue from memory by indicating the cue to be retrieved and clicking on the "RCL" icon shown in window 70 of FIG. 19. Thereafter, the previously stored lighting effect as a function of the stored parameters can be displayed on the screen and updated. The programmer can alter any parameter that does not conform to the actual situation. If a target location for the cue has been relocated, the programmer can select the target as discussed above and "drag" it to its new location. As an alternative the programmer may also update any target information by interacting with the modelling system by means of a dialogue box.

DATA TRANSFER

As suggested in FIG. 1, the cue data that is written by the programming system to define a lighting effect is translated into data that may be transferred directly to a lighting control console or to local lighting instruments. (In the latter case, the modelling computer is serving as the console.) The syntax of the data should be mutually interpretable by the modelling and programming system disclosed herein and by the conventional control consoles and lighting instruments. In addition to being machine readable, it is preferrable that the data format be human readable as well. A readable textual representation of the data makes the debugging process easier. The modelling and programming tool, and the actual lighting system should be able to read and write in this data format to facilitate bidirectional communication. Additionally, error handling capabilities allow the system to be fault tolerant.

The data format also provides a uniform method for storing all of the cue information that is necessary for each lamp. The file can be arranged in a manner that lists the name and location of each lamp, and stores the parameter data for every cue in the show.

Using the bidirectionality facilitated by this data format, the user can transfer data which has been created or modified in the control console back into the modelling system for subsequent display and further modification.

REAL-TIME RENDERING

The data that has been stored by the modelling system may be processed by a rendering device in order to generate photo-realistic images that represent the stored data. This service is provided for example by the use of a RenderMan program. See "The RenderMan Interface" published by Pixar, 3240 Kerner Blvd., San Rafael, Calif. 94901. This document details the services available from a RenderMan rendering program.

These images can be utilized to depict what the lighting effect is going to look like. Further, utilizing computer animation techniques to project a continuous sequence of cues at speeds which approach real-time, the viewer can observe chases and the dynamics of the lighting show. The quality of the simulation is a function of the sophistication of the hardware and software platforms that are selected to do the rendering. The sophistication of the image that is available to an average user will improve as the costs and processing power of available systems improve. The technology is moving closer to lower cost systems with excellent simulation capabilities. Ultimately these rendering devices can be used by lighting designers to present a client with a completely simulated performance complete with all of the lighting effects.

Using speaker-independent voice recognition systems with large vocabularies such as those sold by Kurzweil Applied Intelligence of Waltham, Mass., the modelling system can provide spoken access to any of its capabilities.

VIRTUAL CONSOLE / VIRTUAL REALITY

With equipment developed by VPL, 656 Bair Island Road, Redwood City, Calif., 94063, the 2-D display screen of the modelling system can be replaced by a 3-D display in which the user is represented by a "virtual self", allowing him to "enter" the simulation and interact with it.

The user can control his "virtual self" by means of a Data-Glove, which is a device to measure the degree of bend of the joints of each finger, and the movement and location in space of the fingers and the hand. Information from the Data-Glove is transmitted to the host computer and represents what the hand is doing at any moment.

The program uses this input to control the user's "virtual self" which can appear to pick up and manipulate virtual objects in the model. Movement of objects in the model can now be accomplished by the user causing his "virtual self" to pick up the object and transport it to its new location. For example, the user can grab a light beam and move it, thereby refocussing that luminaire on a new target.

Additionally the user can be presented with a virtual control console with which his "self" can interact. By manipulating the controls of this virtual console as he would a real console, the user has an additional method of controlling the lights and lighting effects. Likewise, the user can write, store and recall cues as he would using a real console.

DISTRIBUTION OF FUNCTIONS OF OUT OF SERVICE LIGHTS

The modelling system offers the further feature of being able to distribute the functions for any lights that go out of service. The functions of these out of service lights can be transferred to other lights that are in the lighting system. The lighting system can sense when a particular light has gone out of service. Additionally, the lighting system knows the associated targets and lighting parameters for each cue. Correspondingly, the functions of a light may be redistributed to alternate or backup lights when a light cannot perform the functions.

INTEGRATED MODELLING SYSTEM

In some cases the modelling computer can be integrated with the console and share tasks with the controller, including in certain circumstances, the direct control of the lights.

What is claimed is:

1. A computer-controller system for modelling a lighting production including characteristics of a production site in which said lighting production is to be performed and lighting scenes produced upon lighting targets, by a lighting console and lighting instruments without requiring access to the site, console or lighting instruments, one or more of said lighting instruments having a plurality of adjustable lighting parameters, said modelling system including:
   data entry means adapted to receive:
   (1) site data describing relevant characteristics of the lighting site including the location of said lighting targets within said lighting site;
   (2) light selection data identifying the selection of the lighting instruments to be operational in the production of said lighting scenes;
   (3) instrument data describing relevant characteristics of each of said lighting instruments including the location of said selected lighting instruments within said lighting site; and
   (4) parameter data describing values of said lighting parameters associated with each of said selected lighting instruments;
   a memory coupled to said data entry means for storing said site, light selection, instrument and parameter data;
   a processor coupled to said memory for computing from said stored site, light selection instrument, and parameter data, three dimensional representations of the aggregate lighting scene, said representation including a simulation of one or more of said selected lighting instruments conforming to said associated parameter data; and
   a monitor coupled to said processor for displaying certain of said three dimensional representations.

2. The system according to claim 1 in which said data entry means include means displayed on said monitor prompting the entry of said data.

3. The system according to claim 1 including means for computing the relationships among the received data such that changes in certain of said data produce related changes in data dependent thereon.

4. A system as defined in claim 1 including means for generating at least one spreadsheet for listing certain of said data describing the actual lighting production.

5. A system as defined in claim 1 wherein said processor for computing said representations include means for simultaneously generating and displaying views of said lighting scenes from different perspectives.

6. A system as defined in claim 1 in which said processor for computing said representations includes means for displaying the contributions of the site, instrument and parameter data values to the aggregate lighting scene.

7. A system as defined in claim 1 including means for computing pan and tilt values as a function of lighting instrument location and target position.

8. A system as defined in claim 1 including means for organizing the components of said site parameters on a hierarchical basis.

9. A system as defined in claim 1 wherein said data entry means includes means for generating menus, dialog boxes and icons to facilitate entering of said data.

10. The system according to claim 1 in which said representations constitute cues which can be stored and recalled at will.

11. A system according to claim 1 in which said lighting parameters can be specified in terms of target positions.

12. A system according to claim 1 in which said lighting targets include representations of performers and wherein lighting parameter data can be defined and processed to illuminate portions of said performer.

13. A system according to claim 1 including means for representing target volume as an object in the system and wherein said volume can be moved and sized, producing corresponding adjustments in associated lighting parameters.

14. A system according to claim 1 in which said data entry means for receiving site data includes means for generating a plurality of orthogonal views on said monitor to display the positional relationship to objects in said site.

15. A system according to claim 1 in which the output of said computing system is linked to said console for the exchange of lighting parameters.

16. A system according to claim 1 in which said modelling system includes means for displaying model data in a variety of selectable formats.

17. A system according to claim 1 in which said modelling system includes means for receiving from said console, data describing actual productions for review and modification by said modelling system.

18. A system according to claim 1 in which said modelling system includes means for controlling said lighting instruments from said modelling system.

19. A system according to claim 1 in which said modelling system includes means for specifying the relation between model objects.

20. A system according to claim 1 in which said modelling system includes means for simulating dynamic aspects of said lighting scenes.

21. A method for modelling a lighting production including characteristics of a production site in which said lighting production is to be performed and lighting designs produced upon lighting targets by a lighting console and lighting instruments, one or more of said lighting instruments having a plurality of adjustable lighting parameters, said modelling method employing a computing system having a graphic display program, data entry means, data processing means including a graphic generating program, a memory and a monitor; said method comprising the steps of:

- entering and storing site data into said computing system describing relevant characteristics of said lighting site including the positional relationship of said lighting targets within said lighting site;
- entering and storing instrument data into said computing system describing relevant characteristics of each of said lighting instruments including the positional relationship of said selected lighting instruments to said site;
- entering and storing light selection data into said computing system identifying the lighting instruments to be operational in a scene;
- entering and storing parameter data in said computing system describing the lighting parameters associated with each of said selected lighting instruments;
- computing from said stored site, instrument, light selection parameter data a three dimensional representation of the aggregate lighting design, said representation including a simulation of one or more of said selected lighting instruments conforming to said associated parameter data; and
- displaying said three dimensional representation on said monitor.

22. The method according to claim 21 including the step of generating displays on said monitor prompting the entry of said data and minimizing the entry of illegal data.

23. The method according to claim 21 including computing the relationships among the entered data such that changes in certain of said data produce related changes in data dependent thereon.

24. A method according to claim 21 including generating spreadsheets of adjustable format including at least one spreadsheet for listing certain of said data describing the actual lighting production.

25. A method as defined in claim 21 including the step of simultaneously generating and displaying views of said lighting scenes from different perspectives.

26. A method as defined in claim 21 in which said displaying step includes displaying the contributions of the site, instrument, light selection and light parameter values to the aggregate lighting scene.

27. A method as defined in claim 21 including computing pan and tilt values as a function of lighting instrument location and target position.

28. A method as defined in claim 21 including organizing the descriptions of said site on a hierarchical basis.

29. A method as defined in claim 21 including generating menus, dialog boxes and icons to facilitate entering of said data.

30. The method according to claim 21 in which said aggregate lighting designs constitute cues which can be stored and recalled at will.

31. The method according to claim 21 in which said lighting parameters can be specified in terms of target positions.

32. A method according to claim 21 in which said lighting targets include representations of performers and wherein lighting parameter data are defined and processed to illuminate portions of said performer.

33. A method according to claim 21 including generating data representing target volume as an object in the system and producing corresponding adjustments in associated lighting parameters when said volume is moved or sized.

34. A method according to claim 21 in which said displaying step includes the step of displaying a plurality of orthogonal views on said monitor to display the positional relationship of objects in said site.

35. A method according to claim 21 including the exchange of lighting scene parameters between said modelling system and and said lighting system.

36. A method according to claim 21 including displaying model data in a variety of selectable formats.

37. A method according to claim 21 including receiving from said console, data describing actual productions for review and modification by said modelling system.

38. A method according to claim 21 including controlling said lighting instruments from said modelling system.

39. A method according to claim 21 including specifying the relation between model objects.

40. A method according to claim 21 including simulating dynamic aspects of said lighting scenes.

41. A method for focusing a lighting instrument on an associated lighting target in a lighting system comprised of one or more lighting instruments having a plurality of adjustable parameters relating to beam characteristics and beam position, said method employing a computing system having data entry means, data processing means, and a memory, said method comprising the steps of:

- entering into said memory site data describing the characteristics of a site in which said lighting production is to be performed, said site data including a reference point in said site;
- entering into said memory instrument data describing at least one lighting instrument to be included in said site for producing a desired lighting effect including the position of said instrument with respect to said reference point of said site;
- entering into said memory target data describing at least one target to be included in said site including the position of said target with respect to said reference point of said site;
- selecting at least one of said lighting instruments to be operational in a desired lighting design;
- identifying a desired lighting target to be associated with said selected lighting instrument for said desired lighting design;
- processing said site, instrument and target data to determine the positional relationship of said associated target with respect to said selected lighting instrument; and
- computing from said positional relationship the displacement necessary to focus said instrument on said target.

42. The method according to claim 41 further including the step of determining the displacement necessary for said instrument to maintain the focus of said instrument on said target upon movement of said target.

43. The method according to claim 41, further including the steps of:

- selecting a plurality of lighting instruments to be operational in a desired configuration;
- identifying a desired lighting target to be associated with said selected plurality of lighting instruments for said desired lighting configuration;
- defining a preset focus symbol for identifying said configuration;

recording data from said configuration including the identification of said target, said selected plurality of instruments and their associated parameters; and filing said recorded data in a preset focus storage record identified by said preset focus symbol so that said recorded data of said configuration may be retrieved for playback by accessing said preset focus storage record.

44. The method according to claim 43, further including the step of transferring said preset focus storage record including said preset focus symbol to a remote control console for playback of said configuration by said remote control console.

45. The method according to claim 43 wherein said lighting configuration including said preset focus symbol is included as part of a lighting cue.

46. The method according to claim 41 wherein said target is further defined with a dimension including the volume of said target.

47. The method according to claim 46 wherein said computing step includes calculating the value of each of said parameters necessary to focus said lighting instrument on a selected portion of said target.

48. The method according to claim 41 wherein said computing of the displacement of said instrument includes calculation of pan and tilt values necessary to displace said instrument to focus on said target.

49. The method according to claim 48 wherein said calculation of said pan and tilt values of said instrument further includes determining which of at least one set of pan and tilt values provides the minimum amount of displacement of said instrument to focus said instrument on said target.

50. The method according to claim 48 wherein said calculated pan and tilt values are stored as part of a cue data.

51. The method according to claim 50 wherein said cue data is transferred to a remote console controller and stored for subsequent playback or update by said remote console controller.

52. The method according to claim 50 wherein said cue data is transferred to an actual lighting instrument and stored for subsequent access by said instrument.

53. A lighting system including:
a plurality of lamp units, one or more of said lamp units having adjustable lamp parameters;
a control console including manual control means for generating command data for adjusting certain of said lamp parameters and further including a communication port for receiving data from an external source; and
a modelling unit comprising:
a processor with at least one associated stored program for modelling the functions of said manual control means;
a signal generator for generating modelled command data in response to manipulations of said modelled functions of said manual control means, said modelled command data being in a format compatible to said control console;
memory means for storing said stored program and said modelled command data; and
communication means for communicating said modelled command data to said control console through said communication port.

54. The lighting system according to claim 53, wherein said modelling unit includes user interface means for manipulating certain of said modelled manual control means for adjusting corresponding lamp parameters.

55. The lighting system according to claim 53, wherein said communication means of said modelling unit bidirectionally communicates with said control console.

56. The lighting system according to claim 53, wherein activity in said modelling unit is reflected in said control console.

57. The lighting system according to claim 53, wherein activity in said control console is reflected in said remote modelling unit.

58. The lighting system according to claim 53, wherein said modelling unit includes display means for graphically simulating the lighting effects of the lamp units of said lighting system and for displaying responses in accordance to manual manipulation of corresponding manual control means of said control console.

59. A method for focusing a lighting unit on an associated lighting target in a lighting system having a plurality of lighting units with adjustable parameters including variable azimuth, $\Theta$, and elevation, $\Phi$, for controlling the focus position of said lighting unit; said focusing method employing a computing system having data entry means, data processing means and data storage means, said focusing method comprising:
entering data into said computing system describing the positional coordinates (x,y,z) of at least one of said lighting targets relative to a fixed position within a production site;
entering data into said computing system describing the positional coordinates (a,b,c) of at least one of said lighting units relative to said fixed position within said production site;
selecting at least one of said lighting units to be active in a desired lighting design;
identifying a desired lighting target to be associated with said selected lighting unit for said desired lighting design;
retrieving from said entered data the positional coordinates of said selected lighting unit and said associated lighting target within the production site for a particular lighting design;
translating the positional coordinates (x,y,z) of said selected lighting target into corresponding positional coordinates (x', y', y') relative to said positional coordinate (a,b,c) of said associated lighting unit; and
computing the azimuth angular value, $\Theta$, and elevation angular value, $\Phi$, of the angular distances of said associated target from said lighting unit for focusing said lighting unit on said associated target based on said positional coordinates (x', y', z') of the lighting target in the coordinate system of said lighting unit.

60. The focusing method according to claim 59 wherein the step of translating the positional coordinates (x,y,z) of said selected lighting target within the production site into positional coordinates (x', y', z') in the coordinate system of said associated lighting unit comprises the step of cross-multiplying the positional coordinates (x,y,z) of the lighting target in the production site by the inverse transform matrix of said positional coordinates (a,b,c) of the lighting unit within the production site.

61. The focusing method according to claim 59 further including the step of communicating said determined azimuth angular value, $\Theta$, and said elevation angular value, Φ, to a remote lighting controller as absolute azimuth and elevation angles for controlling the focus position of a lighting unit.

62. The focusing method according to claim 59 further including the step of communicating said determined azimuth angular value, Θ, and said elevation angular value, Φ, to a lighting unit for focusing said lighting unit from said computing system.

* * * * *